US011925826B2

(12) United States Patent
Ringer et al.

(10) Patent No.: US 11,925,826 B2
(45) **Date of Patent: *Mar. 12, 2024**

(54) DRY SPRINKLER ASSEMBLIES

(71) Applicant: Tyco Fire Products LP, Lansdale, PA (US)

(72) Inventors: Yoram Ringer, Providence, RI (US); Manuel R. Silva, Jr., Cranston, RI (US); George B. Coletta, West Warwick, RI (US); Roger H. Leduc, Pascoag, RI (US); Sean D. Weed, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 564 days.

This patent is subject to a terminal disclaimer.

(21) Appl. No.: 17/208,493

(22) Filed: Mar. 22, 2021

(65) Prior Publication Data

US 2021/0205645 A1 Jul. 8, 2021

Related U.S. Application Data

(63) Continuation of application No. 15/230,272, filed on Aug. 5, 2016, now Pat. No. 10,953,252, which is a continuation of application No. 13/877,443, filed as application No. PCT/US2012/044704 on Jun. 28, 2012, now Pat. No. 9,440,104.

(60) Provisional application No. 61/501,959, filed on Jun. 28, 2011.

(51) Int. Cl.

| | |
|---|---|
| ***A62C 35/62*** | (2006.01) |
| ***A62C 35/68*** | (2006.01) |
| ***A62C 37/12*** | (2006.01) |
| ***A62C 37/14*** | (2006.01) |

(52) U.S. Cl.
CPC .............. *A62C 35/62* (2013.01); *A62C 35/68* (2013.01); *A62C 37/12* (2013.01); *A62C 37/14* (2013.01)

(58) Field of Classification Search
CPC ......... A62C 35/62; A62C 35/68; A62C 37/12; A62C 37/14
USPC .............................................. 169/16, 17, 37
See application file for complete search history.

(56) References Cited

U.S. PATENT DOCUMENTS

| | | | |
|---|---|---|---|
| 1,629,102 | A | 8/1922 | Hicok |
| 2,229,183 | A | 1/1937 | Mitchell |
| 2,180,258 | A | 11/1939 | Rowley |
| 2,211,399 | A | 8/1940 | Winslow |
| 2,291,818 | A | 8/1942 | Loepsinger |

(Continued)

OTHER PUBLICATIONS

U.S. Appl. No. 61/501,959, filed Jun. 28, 2011, Coletta et al.

(Continued)

*Primary Examiner* — Steven J Ganey
(74) *Attorney, Agent, or Firm* — Foley & Lardner LLP

(57) ABSTRACT

A dry sprinkler for a fire protection system having a configuration with one or more coupling arrangements for connection to a fluid supply piping of the system. The dry sprinkler structure further includes an inner surface and inner assembly to provide a preferred discharge performance. The dry sprinkler provides for a flow rate from the outlet of the sprinkler in accordance with the start pressure at the inlet of the sprinkler and the rated discharge coefficient, K factor, ranging between 16.8 GPM/PSI½ and 33.6 GPM/PSI½.

18 Claims, 7 Drawing Sheets

(56) References Cited

U.S. PATENT DOCUMENTS

| | | | | |
|---|---|---|---|---|
| 2,664,956 | A | 1/1954 | Barz | |
| 2,768,696 | A | 10/1956 | Sherburne | |
| 2,871,953 | A | 2/1959 | Bray | |
| 3,007,528 | A | 11/1961 | Gloeckler | |
| 3,061,015 | A | 10/1962 | Cann, Jr. | |
| 3,080,000 | A | 3/1963 | Gloeckler | |
| 3,584,689 | A * | 6/1971 | Willms | A62C 37/09 169/17 |
| 4,007,878 | A | 2/1977 | Anderson | |
| 4,091,872 | A | 5/1978 | Mountford | |
| 4,177,862 | A | 12/1979 | Bray | |
| 4,220,208 | A | 9/1980 | Jackson et al. | |
| 4,228,858 | A | 10/1980 | Sclafani | |
| 4,417,626 | A | 11/1983 | Hansen | |
| 4,582,347 | A | 4/1986 | Wilcox et al. | |
| 4,712,812 | A | 12/1987 | Weir, III | |
| 5,110,160 | A | 5/1992 | Brozovic | |
| 5,188,185 | A | 2/1993 | Mears | |
| 5,228,520 | A | 7/1993 | Gottschalk | |
| 5,415,239 | A | 5/1995 | Kotter et al. | |
| 5,609,211 | A | 3/1997 | Meyer et al. | |
| 5,775,431 | A | 7/1998 | Ondracek | |
| 5,967,240 | A | 10/1999 | Ondracek | |
| 6,851,482 | B2 | 2/2005 | Dolan | |
| 6,976,543 | B1 | 12/2005 | Fischer | |
| 7,516,800 | B1 | 4/2009 | Silva et al. | |
| 7,559,376 | B2 | 7/2009 | Silva, Jr. | |
| 7,766,252 | B2 | 8/2010 | Jackson et al. | |
| 7,921,928 | B2 * | 4/2011 | Thompson | A62C 37/11 169/17 |
| 8,225,881 | B2 | 7/2012 | Silva, Jr. | |
| 8,327,946 | B1 | 12/2012 | Silva et al. | |
| 8,469,112 | B1 | 6/2013 | Silva et al. | |
| 8,528,653 | B1 | 9/2013 | Silva et al. | |
| 8,636,075 | B2 | 1/2014 | Franson et al. | |
| 8,746,356 | B1 | 6/2014 | Silva et al. | |
| 8,826,998 | B2 | 9/2014 | Silva, Jr. | |
| 9,440,104 | B2 * | 9/2016 | Ringer | A62C 37/14 |
| 2003/0075343 | A1 | 4/2003 | Ballard | |
| 2003/0079889 | A1 | 5/2003 | Meyer et al. | |
| 2005/0173562 | A1 | 8/2005 | Franson et al. | |
| 2007/0187116 | A1 | 8/2007 | Jackson et al. | |
| 2009/0101367 | A1 | 4/2009 | Healy | |
| 2009/0211772 | A1 * | 8/2009 | Silva, Jr. | A62C 37/10 169/37 |
| 2014/0096981 | A1 | 4/2014 | Ringer et al. | |
| 2014/0102729 | A1 * | 4/2014 | Ringer | A62C 37/14 169/17 |

OTHER PUBLICATIONS

Central Sprinkler Corporation, Dry Pendent Sprinklers Recessed, Flush and Extended Types Model “A-1”, 1986 (2 pages).

Chemetron Fire Systems, Model ME-1 Flush Type Dry Pendent:(4 pages).

Dry Pendent Drop Sprinkler, Data Sheet AS 1.59 (2 pages).

Engineering Drawings of the Dry Pendent Drop Sprinkler described in Data Sheet AS 159 (10 pages).

Extended European Search Report on 12804242.1, dated Jul. 14, 2015, 6 pages.

Factory Mutual Research Corporation, “Approval Standard for Automatic Sprinklers for Fire Protection, Class Series 2000” (Sections 4.8 and 4.13), May 1998 (5 pages).

Globe Fire Sprinkler Corporation, “Automatic Sprinklers Model J Bulb Spray Series Dry Type Pendent Recessed Pendent”, Aug. 1990 (8 pages).

Globe Fire Sprinkler Corporation, “Dry Pendent Sprinklers Model F960 Designer. 1/2 Orifice”, Feb. 2001 (4 pages).

Golinveaux, James E., “A Technical Analysis: The Use and Maintenance of Dry Type Sprinklers”, http://www.tyco-fire.com1TFP_common/DrySprinklers.pdf, Jun. 2002, (15 pages).

Grinnell Corporation, Dry Sprinklers, Quick Response, Data Sheet of Model F960, Jun. 1998 (1 sheet).

Grinnell Corporation, Engineering drawings of Model F960 Dry Pendent Bulb Type Sprinkler Yoke, Rev. Jan. 3, 1991 (1 sheet).

Grinnell Corporation, Engineering drawings of Model F960 Dry Pendent BulbType Sprinkler Assembly, Apr. 24, 1991 (1 sheet).

https://web.archive.org/web/20111004195717/http/vikinggroupinc.com/databook/sprinklers/storage/050707.

International Search Report and Written Opinion on PCT/US2012/044621, dated Jan. 25, 2013, 11 pages.

International Search Report and Written Opinion on PCT/US2012/044704, dated Jun. 7, 2013, 9 pages.

Journal of the National Fire Sprinkler Association, No. 149, SQ Best Practices, Jul./Aug. 2008, pp. 54-55, 11 pages.

Lake, J.D., Automatic Sprinkler Systems Handbook, National Fire Protection Association, 11th Edition, 2010, pp. 40-43 (6 pages).

Preussag Minimax, “Sprinkler-Teile/Parts Trockensprinkler dry sprinkler”, Jan. 1989 (2 pages).

Reliable, “Model G3 Dry Sprinkler”, Nov. 1987 (4 pages).

The Viking Corporation, Viking Technical Data, ESFR Dry Pendent Sprinkler VK501(K14.0), May 2, 2011, pp. 122a-122h.

Total Walther Feuerschutz GmbH, Hangender Trockensprinkler GHTS 15, Dry Pendent Sprinkler anti-gel Kenblatt-Nr. 4-044-03, Jan. 1989 (2 pages).

Tyco DS—Jul. 1, 2001 Datasheets (TFP500, TFPSI0, TFP520).

Tyco DS—Oct. 2, 2001 Datasheets (TFP530, TFP540).

Underwriters Laboratories Inc., “UL 199 Standard for Automatic Sprinklers for Fire-Protection Service”, (Sections 20 and 29, Apr. 8, 1997 (4 pages).

Underwriters Laboratories, Inc., Fire Protection Equipment Directory, 2004, pp. 569-570 (3 pages).

Victaulic, “Models V3606 and V3605 Dry Type Standard Spray Pendent and Recessed Pendent Standard and Quick Response”, 2002, (4 sheets).

Victaulic, Models V3608 and V3607 Standard Spray Pendent and Recessed Pendent Standard and Quick Response, Apr. 2001 (4 pages).

Victaulic. Models V3604 and V3603 Dry Type Upright-Standard and Quick Response, 4 sheets, Apr. 2001.

Viking Corp., Technical Data, “Dry Pendent Sprinklers Model C”, Jan. 1987 (4 pages).

Viking Corp., Technical Data, “Model M Quick Response Dry Pendent Sprinkler”, Apr. 9, 1998, (4 sheets).

* cited by examiner

DRY SPRINKLER ASSEMBLIES

PRIORITY CLAIM INCORPORATION BY REFERENCE

This application is a continuation of U.S. patent application Ser. No. 15/230,272, filed Aug. 5, 2016, which is a continuation of U.S. patent application Ser. No. 13/877,443, filed Jun. 17, 2013, which is a national phase application of International Application No. PCT/US2012/044704, filed Jun. 28, 2012, which claims the benefit of priority to U.S. Provisional Patent Application No. 61/501,959, filed Jun. 28, 2011, which is incorporated by reference in its entirety.

BACKGROUND OF THE INVENTION

Automatic sprinkler systems are some of the most widely used devices for fire protection. These systems have sprinklers that are activated Once the ambient temperature in an environment, such as a room or building exceeds a predetermined value. Once activated, the sprinklers distribute fire-extinguishing fluid, preferably water, in the room or building. A sprinkler system is considered effective if it extinguishes or prevents growth of a fire. The effectiveness of a sprinkler is dependent upon the sprinkler consistently delivering an expected flow rate of fluid from its outlet for a given pressure at its inlet. The discharge coefficient or K-factor of a sprinkler allows for an approximation of flow rate to be expected from an outlet of a sprinkler based on the square root of the pressure of fluid fed into the inlet of the sprinkler. As used herein and the sprinkler industry, the K-factor is a measurement used to indicate the flow capacity of a sprinkler. More specifically, the K-factor is a constant representing a sprinkler's discharge coefficient, that is quantified by the flow of fluid in gallons per minute (GPM) through the sprinkler passageway divided by the square root of the pressure of the flow of fluid fed to the sprinkler in pounds per square inch gauge (PSTG.). The K-factor is expressed as GPM/(PSI)$^{1/2}$. Industry accepted standards, such as for example, the National Fire Protection Association (NFPA) standard entitled, "NFPA 13: Standards for the Installation of Sprinkler Systems" (2010 ed.) ("NFPA 13") provides for a rated or nominal K-factor or rated discharge coefficient of a sprinkler as a mean value over a K-factor range. As used herein, "nominal" describes a numerical value, designated under an accepted standard, about which a measured parameter may vary as defined by an accepted tolerance. For example, for a K-factor greater than 14, NFPA 13 provides the following nominal K-factors (with the K-factor range shown in parenthesis): (i) 16.8 (16.0-17.6) GPM/(PSI)$^{1/2}$; (ii) 19.6 (18.6-20.6) GPM/(PSI)$^{1/2}$; (iii) 22.4 (21.3-23.5) GPM/(PSI)$^{1/2}$; (iv) 25.2 (23.9-26.5) GPM/(PSI)$^{1/2}$; (v) 28.0 (26.6-29.4) GPM/(PSI)$^{1/2}$; and 33.6 (31.9-35.3) GPM/(PSI)$^{1/2}$.

The fluid supply for a sprinkler system may include, for example, an underground water main that enters the building to supply a vertical riser. At the top of a vertical riser, an array of pipes extends throughout the fire compartment in the building. In the piping distribution network atop the riser includes branch lines that carry the pressurized supply fluid to the sprinklers. A sprinkler may extend up from a branch line, placing the sprinkler relatively close to the ceiling, or a sprinkler can be pendent below the branch line. For use with concealed piping, a flush-mounted pendent sprinkler may extend only slightly below the ceiling.

Fluid for fighting a fire can be provided to the sprinklers in various configurations, In a wet-pipe system, for buildings having heated spaces for piping branch lines, all the system pipes contain water for immediate release through any sprinkler that is activated. In a dry-pipe system, branch lines and other distribution pipes may contain a dry gas (air or nitrogen) under pressure. Dry pipe systems may be used to protect unheated open areas, cold rooms, buildings in freezing climates, cold-storage rooms passageways, storage or other occupancies exposed to freezing temperatures, such as unheated. The gas pressure in the distribution pipes may be used to hold closed a dry pipe valve at the riser to control the flow of fire fighting liquid to the distribution piping. When heat from a fire activates a sprinkler, the gas escapes and the dry-pipe valve trips, water enters branch lines, and fire fighting begins as the sprinkler distributes the fluid.

Dry sprinklers may be used where the sprinklers may be exposed to freezing temperatures, NFPA 13 defines a dry sprinkler as a "sprinkler secured in an extension nipple that has a seal at the inlet end to prevent water from entering the nipple until the sprinkler operates." Accordingly, a dry sprinkler may include an inlet containing a seal or closure assembly, some length of tubing connected to the inlet, and a fluid deflecting structure, such as for example, a sprinkler body or frame and deflector located at the other end of the tubing. There may also be a mechanism that connects a thermally responsive component to the closure assembly. The inlet is preferably secured to a branch line by one of a threaded-type coupling or a clamp or grooved-type coupling. Depending on the particular installation, the branch line may be filled with fluid (wet pipe system) or be filled with a gas (dry pipe system). In either installation, the medium within the branch line is generally excluded from the passageway of the extension nipple or tubing of the dry sprinkler via the closure assembly in an unactuated state of the dry sprinkler. Upon activation of the thermally responsive component, the dry sprinkler is actuated and the closure assembly is displaced to permit the flow of fluid through the sprinkler.

In known dry sprinklers, an arrangement of internal components is provided to position the closure assembly in both the actuated and unactuated state of the sprinkler. In the actuated state, the internal components in combination with the thermally responsive component, positions the closure assembly at a sealing surface to provide a fluid seal at the inlet end of the unactuated dry sprinkler. The internal components, upon activation of the thermally responsive component, positions the closure assembly within the passageway to permit flow through the dry sprinkler in accordance with the rated discharge coefficient or nominal K-factor of the sprinkler. Accordingly, the internal components and closure assembly of the sprinkler and their geometry within the inlet and passageway of the sprinkler can impact the performance and effectiveness of the sprinkler. For known embodiments of dry sprinklers, as seen for example, in U.S. Pat. Nos. 7,559,376 and 7,516,800, the seal assembly-to-sealing surface contact at the inlet of the sprinkler may provide little internal volume for the seal assembly or its support member(s) once the sprinkler is actuated. To permit the desired flow through the sprinkler, some known sprinklers employ rotating sealing assemblies to displace the seal out of the water flow path. However, with increasing K-factor, a greater force is generally required to rotate or alter the position of the sealing assembly. The presence of the seal assembly in the internal volume of the inlet after actuation may present an unsuitable resistance to water flow thereby inhibiting the ability of the dry sprinkler to achieve particular rated K-factors with certain nominal sized threaded inlets. This resistance can prevent high K-factors, e.g., greater than 14 and in particularly, nominal 16.8 GPM/PSI$^{1/2}$ or greater, with the certain nominal sized threaded inlets.

U.S. Published Patent Application No. 2007/01 871 16 to Jackson et al. describes and shows one known dry sprinkler. Jackson et al. describe the dry pipe sprinkler as including a sprinkler body having a thermally responsive trigger mounted thereto. A housing, including an inlet end and an outlet end, is provided with the outlet end being connected to the sprinkler body. A seal member is disposed at the inlet end of the housing, and a load mechanism extends between the thermally responsive element and the seal member. The load mechanism may include a support portion, a passage tube portion, and an outlet orifice portion slidably received within the housing and movable within the housing upon activation of the thermally responsive trigger to allow the seal member to be dislodged from the inlet end of the housing to allow suppressant fluid to flow therethrough. FIGS. 15 and 16 of Jackson et al. show the inlet body 22 can be provided with external threads 64 for threadedly engaging the system piping. Alternatively, as shown in FIG. 17, the inlet body 22' can be configured to provide a grooved inlet connection with the sprinkler system piping 8 or, alternatively, can be provided with other coupling configurations. Jackson et al. therefore describes and shows removing and replacing one inlet body with another inlet body in order to provide different alternative connections. Jackson et al., accordingly, fails to describe or show concurrently providing alternative couplings. More specifically, Jackson et al. does not show a single dry sprinkler structure having two or more coupling configurations to provide multiple modes for connection to a system piping.

There exists a need for a single dry sprinkler that can achieve various nominal K-factors for various nominal inlet sizes; and in addition have multiple alternative coupling arrangements that can, in combination with an arrangement of internal sprinkler components, provide the desired flow characteristics for a given fluid inlet pressure so as to satisfy the designed nominal K-factor or rated discharge coefficient of the sprinkler. It is also desirable to have a dry sprinkler with an internal assembly that locates its seal assembly within the sprinkler inlet upon actuation so as to permit a desire flow for the nominal K-factor of the sprinkler in combination with a desired inlet and casing tube extension size and configuration. Moreover, there is a need for the alternative coupling arrangements to be able to connect to standard pipe fittings, i.e., T-fittings, pipe nipples, pipe reducers, etc. that may be encountered in either a wet or dry sprinkler system. Accordingly, where it is desirable to have a single configuration of a dry sprinkler for either wet or dry system installation, it may be desirable to have an internal structural configuration for only one of a wet or dry system installation or alternatively both a wet and a dry system installation. In addition, it is desirable for the dry sprinkler structure to be sized for easy and efficient handling and installation. Accordingly, it is desirable for the sprinkler structure to be minimized in weight in relation to, for example, the dry sprinkler weight.

SUMMARY OF THE INVENTION

The present invention provides a dry sprinkler for a fire protection system. The present invention allows a dry sprinkler having an inlet with an arrangement for a threaded-type coupling, a grooved-type coupling or dual-type coupling arrangement for connection to the fluid supply piping of the system. Moreover, the arrangement of components provides for an internal structural assembly that provides the dry sprinkler with particular nominal K-factors, for example, 16.8 GPM/PSI$^{1/2}$ or greater for various nominal inlet and casing tube sizes.

One particular embodiment provides for a dry sprinkler having a dual connection that includes an external thread for a threaded-type coupling connection and an external groove for a grooved-type coupling connection. The preferred dry sprinkler further includes an inner surface structure that cooperates with a preferred inner assembly of the sprinkler to provide a preferred discharge performance. More specifically, the preferred sprinkler provides fora flow rate from the outlet of the sprinkler in accordance with the start pressure at the inlet of the sprinkler and the rated or nominal K-factor of the sprinkler being at least about 16.8 GPM/PSI$^{1/2}$ and may be preferably any one of 16.8, 19.6, 22.4, 25.2, 28.0, and 33.6 GPM/PSI$^{1/2}$.

One preferred embodiment of the dry sprinkler has a proximal end and a distal end. The sprinkler includes an outer structure assembly preferably includes an inlet fitting at the proximal end, an outlet frame at the distal end with a casing tube in between coupling the inlet fitting to the outlet frame and defining an internal passageway of the sprinkler. An internal assembly and more preferably a sealing assembly is disposed within the passageway to seal the inlet fitting and the passageway in an unactuated state of the sprinkler. The outer structural assembly defines an internal passageway defining a longitudinal axis of the sprinkler and a rated K-factor preferably ranging between a nominal K-factor of 16.8 GPM/PSI$^{1/2}$ to 33.6 GPM/PSI$^{1/2}$. A preferred inlet fitting includes a proximal head portion and a distal body portion, the head portion having an external thread defining an external thread diameter, the body portion including an external groove defining a diameter of the body portion being greater than the external thread diameter. The external thread and groove respectively providing the sprinkler with alternate threaded and grooved means for connection to a fluid supply pipe. For the dry sprinkler having a preferred nominal K-factor of 16.8 GPM/(PSI)$^{1/2}$, the clamp groove of the inlet fitting defines a preferred minimum nominal 2 inches for coupling to a correspondingly sized pipe or pipe fitting. In another aspect of the preferred embodiment, the external threads are preferably configured with American National Standard Taper Pipe Thread (NPT) wider ANSI/ASME B 1.20.1-198 defining any one of a nominal ¾ inch, 1 inch, and maximum 1.25 inch NPT and/or International Standard ISO 7-1 (3d. ed., 1994). In one preferred embodiment of the dry sprinkler, the casing tube defines a nominal pipe diameter of 1½ inch and in one aspect, 1.125 in. (internal Diameter)×1.25 in. (Outer Diameter) internal to external diameter. In another aspect, the sprinkler defines an overall length between about two to about fifty inches and more preferably from about nine inches to about forty-eight inches.

The preferred inlet, fitting has an inner surface which cinctures part of the sprinkler internal passageway and preferably: (i) defines a preferred entrance surface; (ii) defines a sealing surface for contact with the internal sealing assembly in the unactuated state of the dry sprinkler; and/or (iii) defines an internal chamber of the inlet for housing the internal sealing assembly and/or other internal components of the dry sprinkler in the actuated state. The inner surface also preferably defines a first section of the passageway disposed along the head portion of the inlet fitting having a first internal diameter of the head portion, and a second section of the passageway disposed along the body portion of the inlet fitting having a second internal diameter greater than the first internal diameter. In one particular embodiment of the inlet fitting, the inner surface defines two or more sections of the passageway with one section between the entrance surface and the sealing surface of the inlet fitting. A second section defines an expanding region of the passageway to transition distally from the first section to be formed between the sealing surface and the widest portion of the interior of the inlet fitting. A distal section of the fitting preferably converges narrowly in the axial direction toward the casing tube.

In another aspect of the inlet fitting, the sealing surface preferably defines the type of system, wet or dry, to which the dry sprinkler can be coupled to. In One embodiment, where the sealing surface of the inlet fitting is located such that the head portion and more particularly the external thread of the inlet fitting extends proximally of the sealing surface, the dry sprinkler is preferably configured for installation in a wet system. In one embodiment of the inlet fitting having a two inch in.) external diameter body portion, the sealing surface preferably defines an internal opening diameter of about 1¼ inch. In an alternate embodiment where the sealing surface is axially located such that the external threads extend distally of the sealing surface in the unactuated state of the sprinkler, the dry sprinkler is preferably configured for installation in either a wet system or a dry system. In one embodiment of the inlet fitting having a maximum external pipe thread diameter of 1¼ inch diameter and the sealing surface defines a preferred internal opening with a diameter of about one inch 1 in.).

The dry sprinkler further includes an internal assembly disposed in the internal passageway. A preferred internal structural assembly includes a fluid tube disposed along the passageway translating axially from a first position in an unactuated state of the sprinkler to a second position in an actuated state of the sprinkler. A thermal trigger engaged with the outlet frame supports the internal assembly and a seal assembly of the internal assembly against a sealing surface of the inlet fitting to define an unactuated state of the sprinkler. Upon actuation of the sprinkler, the internal sealing assembly is axially displaced relative to the outer structure assembly to space the sealing assembly from the sealing surface of the inlet fitting to provide for the desired flow from the sprinkler outlet frame and more particularly a flow rate defined by the rated K-factor. A preferred internal assembly includes a fluid tube having a proximal end engaged with the sealing assembly and a distal end engaged with the proximal end of a guide tube. The distal end of the guide tube is substantially disposed within the sprinkler outlet frame with the thermal trigger engaging and supporting the guide tube in the actuated state of the sprinkler.

A preferred embodiment of the fluid tube includes one or more spaced apart apertures or openings between the ends of the tube for introducing fluid into the fluid tube. In one aspect, the fluid tube may include one or more surface features which can act against the internal surface of the casing tube to maintain the fluid centrally aligned along the passageway. In one particular embodiment, the fluid tube may include one or more spaced apart surface features, projections, dimples, ridges or bumps to contact the inner surface of the casing tube to maintain the fluid tube substantially centrally axially aligned within the casing tube.

In one embodiment of the dry sprinkler, a preferred seal assembly includes a mounting member engaged with the fluid tube having a diverter and more particularly a conical portion. Engaged with and supported by the diverter portion is a spring seal which is preferably biased away from the sealing surface of the inlet fitting. In one embodiment, the spring seal is a metallic annulus or disc member such as for example a Belleville spring. In one particular embodiment, a preferred seal assembly includes a mounting member and a spring seal disposed on the mounting member for contacting the sealing surface in the first position. The mounting member is affixed to the proximal end of the fluid tube such that the sealing assembly member and the fluid tube are maintained in a fixed distance relationship to one another in translation of the internal structural assembly from an unactuated state to an actuated state.

In an alternate embodiment of the dry sprinkler, an inlet fitting includes a proximal head portion and a distal body portion, the inlet fitting having a coupling arrangement for at least one of a thread-type coupling and groove-type coupling arrangement for connection to a fluid supply pipe. The preferred sprinkler includes an internal structural assembly having a seal assembly supported by a fluid tube that is in contact with a sealing surface in an unactuated state of the sprinkler, and is spaced from the sealing surface in an actuated state of the sprinkler. The seal assembly is preferably engaged with a proximal end of the fluid tube such that the seal assembly translates with respect to the fluid tube upon translation of the internal structural assembly in a transition of the sprinkler from an unactuated to an actuated state. Preferably, the fluid tube translates a first distance with respect to the sealing surface and the seal assembly translating a second distance with respect to the sealing surface a second distance greater than the first distance. In one embodiment, the sprinkler includes an inlet fitting providing for each of thread-type coupling and groove-type coupling arrangement for connection to a fluid supply pipe.

In another embodiment of the dry sprinkler, an outer structural assembly has proximal inlet, a distal outlet, and an internal passageway extending between the inlet and the outlet defining a longitudinal axis of the sprinkler. An inlet fitting includes a proximal head portion and a distal body portion, the head portion includes an external thread for a threaded-type coupling connection to a fluid supply pipe. The inlet fitting has an inner surface defining a proximal portion of the internal passageway coaxially and symmetrically disposed about the longitudinal axis. The inlet fitting includes a sealing surface of the dry sprinkler disposed axially along the inner surface such that the external thread extends proximally of the sealing surface. A seal assembly is disposed along the passageway coaxially aligned along the longitudinal axis. The proximal portion of the passageway is coaxially aligned and symmetrically disposed about the sealing assembly in each of the unactuated and actuated states of the sprinkler. In one preferred embodiment, the sealing assembly remains centered along the longitudinal axis in each of the unactuated and actuated states.

In another aspect of the preferred dry sprinkler, the outlet frame includes an internal bore defining a distal portion of the passageway including the outlet of the sprinkler. Preferably, the inner surface of the outlet frame defining the internal bore cinctures part of the internal passageway of the sprinkler. The outlet frame has an outer surface preferably includes coupling threads for coupling the outlet frame to the casing tube. In one particular embodiment of the dry sprinkler having a preferred outlet diameter of about 0.95 inches, the preferred dry sprinkler defines a K-factor value of about 17 GPM/(PSI)$^{1/2}$. In another embodiment, where the outlet of the dry sprinkler outlet frame is about 1.125 inches with a seal assembly axial displacement of about 0.75 inch below the sealing surface, the preferred dry sprinkler defines a nominal K-factor value of about 19.6 GPM/(PSI)$^{1/2}$.

In addition, the outlet frame includes a deflector axially spaced at a fixed distance from the outlet. The outlet frame preferably includes one or more frame arms coupled to the deflector. In one particular embodiment, the deflector includes a substantially planar surface member coupled to the frame arm at a preferably fixed axial distance from the outlet. Accordingly in one aspect, the preferred outlet frame provides for a pendent dry sprinkler configuration.

The thermal trigger of the dry sprinkler may be thermally rated for any one of 135, 155, 165, 175, 200, 214 or 286 degrees Fahrenheit. In one aspect, the thermal trigger is by its thermal sensitivity and more particularly by its Response Time Index (RTI). One embodiment of the dry sprinkler includes a thermal trigger with an RTI of 50 (meters-seconds)$^{1/2}$ or less; alternatively, the trigger has an RTI of 80 (meters-seconds)$^{1/2}$ or more. The subject trigger element in one embodiment includes a solder link and in one particular aspect, includes a strut and lever solder link assembly. Alternatively, the thermal trigger includes a frangible bulb.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Figure 1A:
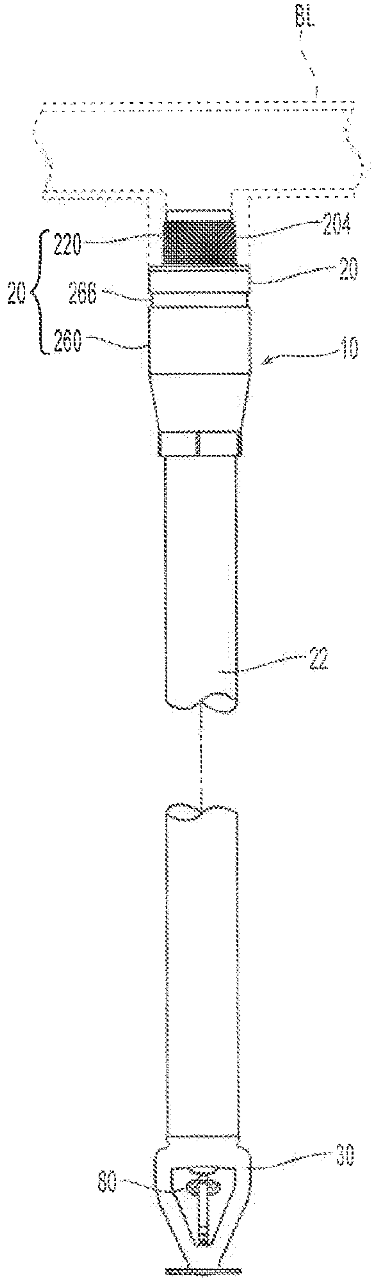
FIG. 1A illustrates a preferred threaded connection of a preferred thy sprinkler of using a threaded connection with a fluid supply pipe.
Figure 1B:
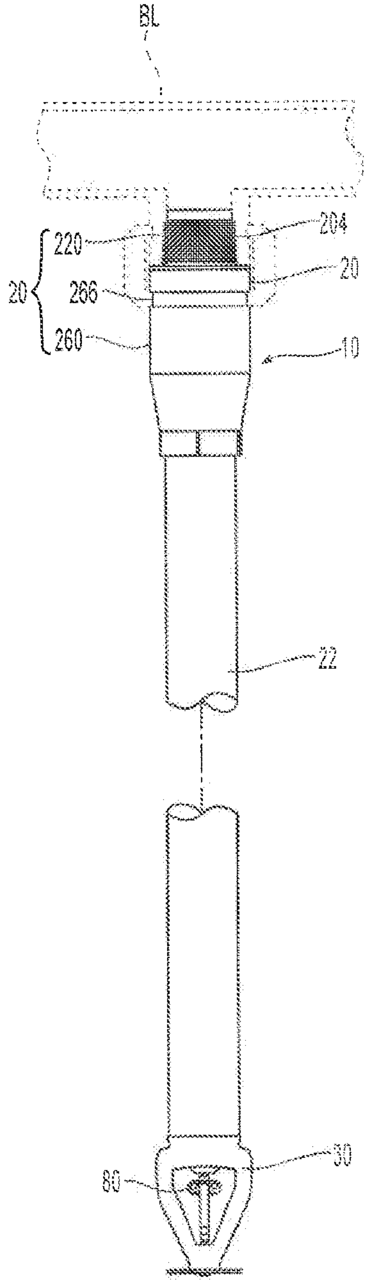
FIG. 1B illustrates a preferred grooved-type coupling connection of the preferred dry sprinkler of FIG. 1A casing a groove-type coupling.
Figure 1C:
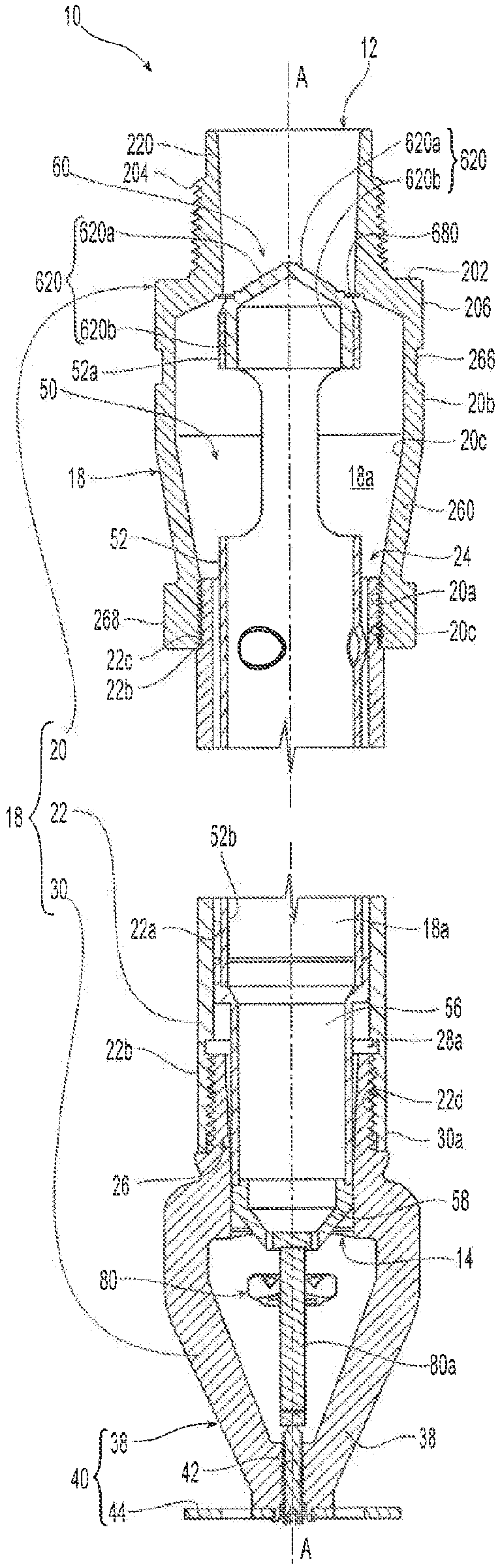
FIG. 1C is a cross-sectional view of a preferred embodiment of a dry sprinkler in an unactuated state.
Figure 1D:
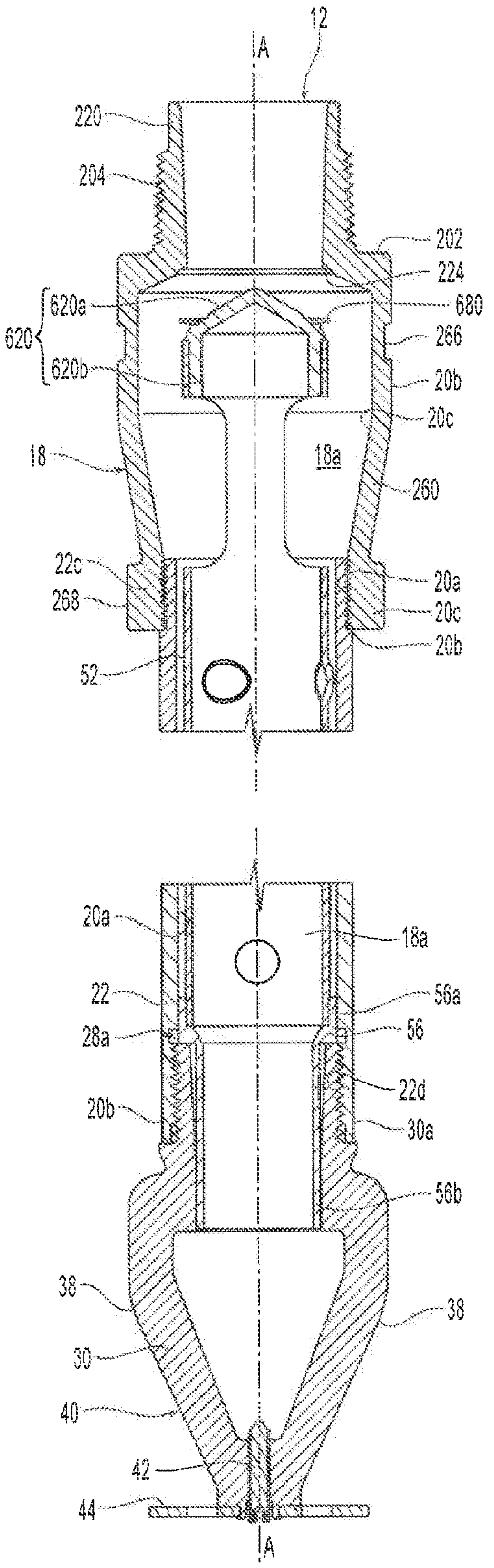
FIG. 1D is a cross-sectional view of the preferred sprinkler of FIG. 1 in an actuated state.

FIGS. 1A and 1B illustrate a preferred embodiment of a dry sprinkler 10 installed and coupled to a pipe fitting of a piping network, which is supplied with a fire fighting fluid, e.g., fluid from a pressurized fluid supply source. The preferred embodiments described herein include dry sprinklers that are suitable for use, for example, with a dry pipe system (e.g. at least a portion of the system is exposed to freezing temperatures in an unheated portion of a building) or a wet pipe system (e.g. the entire system is not exposed to freezing temperatures in an unheated portion of a building) or both. Fluid supply piping systems may be installed in accordance with the NFPA 13. As seen in FIGS. 1C and 1D, the dry sprinkler 10 includes an miter structure assembly 18, an inner structural assembly 50, and a thermal trigger 80. The outer structure assembly 18 defines an internal passageway 18*a* that extends along a central longitudinal axis A-A between a proximal inlet end 12 and a distal outlet end 14. The outer structure assembly 18 preferably includes an inlet fitting 20 at the proximal end, an outlet frame 30 at the distal end with a casing tube 22 preferably in between coupling the inlet fitting 20 to the outlet frame 30.

The inlet fitting 20 includes an outer surface 20*b* and an inner surface 20*c* which in the sprinkler assembly, preferably defines a portion of the passageway 18*a*. The inlet fitting outer surface 20*b* preferably includes fitting threads 204, a clamp groove 266, and a tool engagement portion 268 at the preferably distal end of the fitting 20. The preferred inlet fitting 20 defines a proximal head portion 220 that includes the external fitting threads 204 and a larger distal body portion 260 that includes the external clamp groove 266. The body portion further preferably defines a step transition between the fitting threads 204 and the groove 266 that is preferably circularly circumscribed about the axis A-A so as to define a transition portion 206 of the inlet fitting 20, as seen for example, in FIGS. 2 and 3. The threads 204 and groove 266 provide the dry sprinkler with a single fitting having preferred alternative means for coupling the dry sprinkler 10 to the fluid supply lines of a sprinkler system. More specifically, the threads 204 permit the dry sprinkler to be coupled to a fluid supply line by a threaded connection, as seen for example, in FIG. 1A. The clamp groove 266 permits the dry sprinkler 10 to be connected to the fluid supply line by a groove-type coupling connection, as seen for example, in FIG. 1B. The distal end portion of the fitting 20 preferably includes a tool engagement portion 268 having an exterior shape, e.g., a hexagon, that is suitable for applying, for example, a torque to the inlet fitting 20 when the dry sprinkler 10 is threadably coupled to the piping network via the fitting threads 204. The preferred shape of the inlet fitting 20 with the proximal head portion and larger body portion with the narrowing taper allows for the distal end of the inlet fitting to be coupled to a narrower casing tube 22. Minimizing dimensions of the sprinkler components, such as for example the diameter of the casing tube, can reduce the overall weight and volume of the sprinkler making the sprinkler manageable for handling and shipping. Accordingly, the preferred dry sprinkler can maintain a preferred sprinkler weight (lbs.) to length (inches) ratio. For one preferred embodiment of the sprinkler 10 having a preferred nominal K-factor of 16.8 GPM/(PSI)$^{1/2}$, a total assembled sprinkler length of about 37 inches, and a total assembled sprinkler weight of about ten pounds (10 lbs.), the preferred sprinkler defines a preferred weight to length ratio of about 0.27 lbs./in. and a preferred weight to K-factor ratio of about 0.6 lbs per GPM/(PSI)$^{1/2}$. Alternatively, the outer surface 20*b* may define alternative profiles over its axial length. For example, the outer surface may define a broadening profile in the proximal to distal direction over the length of the inlet fitting 20.

The clamp groove 266 is preferably disposed along the distal body portion 260 downstream of the head portion 220 and more preferably distal of the inlet fitting threads 204. The preferred transition portion 206 provides a surface 202 that faces, contacts, engages and/or preferably abuts the end of a complimentary grooved pipe or pipe fitting of a fluid supply branch line. More preferably, the surface 202 of the transition portion 206 generally provides a surface that extends substantially perpendicularly to the longitudinal axis A-A of the sprinkler and in one aspect defines a stop surface. Accordingly, the groove 266 is preferably located distally of the surface 202, between the surface 202 and the distal end portion, so that the dry sprinkler 10 and the mating pipe fitting can be preferably coupled together by commercially available groove-type pipe couplings. Accordingly the transition between the surface 202 and the groove 26 may define a variable profile provide it permits for a groove-type coupling. Moreover, the portion of the outer surface of the inlet fitting disposed to each side of the groove 266 defines an axial length and profile to permit the groove-type coupling. As is known in the art, a grooved coupling, such as for example Grinnell Grooved Fire Protection Products, Figure 772, Rigid Coupling as shown in Tyco Fire Building Products Technical Data Sheet TFP1950 (July 2004) can be used to couple a fitting, e.g., the inlet fitting 20, with the piping network or another fitting, such as for example, a T-fitting that similarly includes a counterpart groove. For the dry sprinkler 10 having a preferred nominal K-factor of 16.8 GPM/(PSI)$^{1/2}$, the inlet fitting 20 and the clamp groove 266 are sized to a preferred minimum nominal 2 inch size pipe for coupling to a correspondingly sized pipe or pipe fitting. However, the inlet fitting and its clamp groove can be alternatively sized to be smaller or larger to provide a dry sprinkler with a K-factor other than a nominal 16.8 GPM/(PSI)$^{1/2}$, provided the resultant dry sprinkler can provide the desired sprinkler flow performance as described herein. Because the stop surface 202 abuts the mating pipe fitting when forming a groove-type pipe coupling connection therebetween, the portion of the inlet fitting 20 proximal of the stop surface 202 is preferably configured for insertion within the inside diameter of the grooved pipe or pipe fitting to which the dry sprinkler 10 is coupled, as seen for example, in FIG. IB.

The external threads 204 of the dry sprinkler 10 are used in forming a preferred threaded connection between the dry sprinkler and a fluid supply piping network. The transition portion 206 provides a preferred stop that limits relative threaded engagement between the inlet head 20 and the supply pipe or pipe fitting. The inlet end 12 of the fitting 20 and the threads 204 are preferably configured with American National Standard Taper Pipe Thread (NPT) under ANSI/ASME B1.20.1-1983. For example, the inlet fitting threads 204 are preferably formed as at least one of ¾ inch, 1 inch, 1.25 inch NPT and/or international Standard ISO 7-1 (3d. ed., 1994). For a threaded-type coupling installation as shown for example in FIG. 1A, the fluid supply piping fitting BL may be an internally threaded T-Fitting or union with a nominally sized internal thread for complimentary threaded engagement with the external thread 204. In one particular embodiment of the threaded-type coupling installation, the nominal size of the internal thread of the fluid supply pipe fitting is smaller than the external diameter of the distal body portion 260 and more particularly smaller than the external diameter of the transition portion 206. In order that the proximal end of the inlet fitting 20 having the threads 204 can be inserted within the mating pipe fitting in the case of forming a groove-type coupling connection, the size of the fitting threads 204 are preferably a function of the grooved coupling size. More specifically, the thread diameter is maximized yet sized to fit inside fluid supply pipe or fitting. For example, where the groove 266 of the inlet fitting is sized for coupling to a nominal two inch pipe, the inlet fitting thread 204 is at a maximum 1¼ inch NPT. Accordingly the external thread 204 diameter of the inlet fitting is preferably less than the transition portion 206 external diameter.

Figure 2:
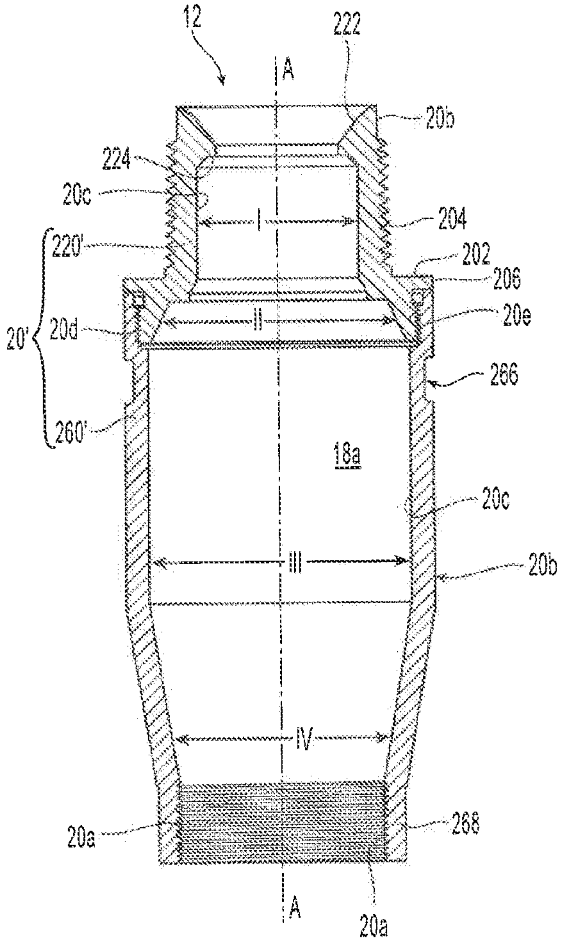
FIG. 2 is one preferred embodiment of an inlet fitting for use in a dry sprinkler.
Figure 3:
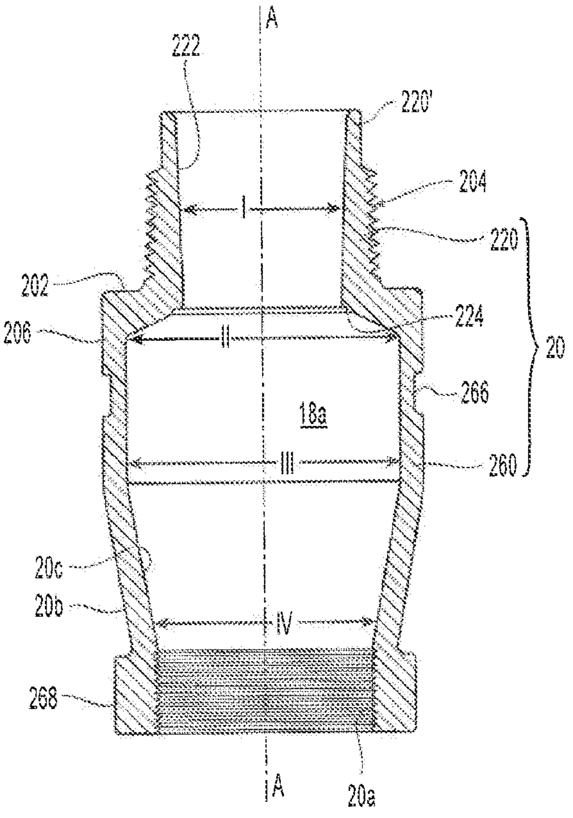
FIG. 3 is another preferred embodiment of an inlet kitting for use in the dry sprinkler of FIGS. 1C and 1D.

With reference to FIGS. 2 and 3, the inlet fitting 20 preferably includes an inner surface 20*c* which defines and cinctures a proximal part of the passageway 18*a* and more preferably: (i) defines a preferred entrance surface 222, (ii) defines a sealing surface 224 for contacting an internal sealing assembly in the unactuated state of the dry sprinkler, and/or (iii) defines an internal chamber of the inlet for housing the internal sealing assembly and/or other internal components of the sprinkler when the dry sprinkler 10 is in the actuated state such that the fluid flows from the outlet to provide at an expected rate for the given inlet pressure. Like reference numerals refer to like features unless otherwise provided. According to the preferred embodiments shown in FIGS. 2 and 3, features of the inlet fitting inner surface 20*c* and the passageway 18*a* preferably define two or more sections within the inlet fitting 20 and more preferably define four sections I, II, III and IV that are each cinctured by different surfaces of the inlet fitting inner surface 20*c*. Section I preferably defines the inlet portion of the passageway 18*a* of the inlet fitting 20 preferably proximal to the transition portion 206 between the entrance surface 222 and the sealing surface 224. Section II preferably defines an expanding region of the passageway to transition distally from Section I between the sealing surface 224 and the widest portion of the interior of the inlet fitting 20 and the passageway 18*a* of Section III of the inlet fitting. Section IV preferably converges narrowly in the axial direction toward the distal end of the fitting 20 and the casing tube 22. The inlet fitting inner surface 20*c* can be alternatively configured provided the resultant profile of the passageway 18*a* in the inlet fitting 20 facilitates the desired fluid flow therethrough. In one preferred aspect, the proximal portion of the passageway 18*a* defined by the inner surface 20*c* is coaxially aligned and more preferably symmetrically disposed about the longitudinal axis A-A.

The preferred inlet fitting 20 of FIG. 3 is preferably a singular, integrated piece constructed of a homogenous material having the fitting threads 204, the clamp groove 266, and the head 268. The inlet fitting 20 is preferably cast or forged and machined as a single component having a head portion 220 and a larger body portion 260. The head portion 220 is preferably cast or forged and machined to include the desired external threads 204 and internal inlet surface 222. The body portion 260 preferably is cast and machined to include the external groove 266 for the groove-type coupling, and internally machined to include the internal thread proximate the distal end portion of the fitting 20 along with the surface profile defining the sealing surface 224 and varying sections of the passageway 18*a*.

Alternatively, the inlet fitting 20', as shown in FIG. 2, includes a separate inlet head 220' and inlet body 260' which are coupled to one another to provide, in combination, the fitting threads 204, the clamp groove 266, and the head 268. Relative threaded engagement between the inlet head 220 and the inlet body 260 preferably includes coupling threads 20*d* on the inlet fitting outer surface 20*b* of the inlet head 220 that cooperatively engage coupling threads 20*e* on the inlet body 260. With reference to FIG. 2, the longitudinal positions of the coupling threads 20*e* on the inlet fitting inner surface 20*c* and the groove 266 on the inlet fitting outer surface 20*b* are offset or longitudinally spaced from one another so as to provide the inlet body 260 with a wall thickness that is adequate to avoid structural deformation and/or failure when coupling the dry pipe sprinkler 10 to the piping network (not shown) using either one of the fitting threads 204 or the clamp groove 266.

Referring to FIGS. 2 and 3, a preferred inlet entrance surface 222 defines the internal surface profile over which fluid is introduced into the dry sprinkler 10. The inlet entrance surface 222 can define various profiles leading to the sealing surface 224. As shown in FIG. 2, the preferred inlet entrance surface 222 defines a radiused profile and more preferably a convex profile with respect to the longitudinal axis A-A to form a compound curved surface intersecting a generally planar sealing surface 224. In an alternative profile as seen in FIG. 3, the inlet entrance surface 222 can be substantially a frustoconical surface disposed about the longitudinal axis A-A that has, in a cross-sectional view, a profile converging towards the longitudinal axis A-A and intersecting the inner surface defining the generally planar sealing surface 224. Preferably, the profile is linear; however, the profile could be, for example, stepped.

The axial location of the sealing surface 224 along the longitudinal axis A-A can define the type of system, wet or dry, to which the dry sprinkler 10 can be preferably coupled to. For example, where the sealing surface 224 of the inlet fitting 20, as shown in FIGS. 1C, 1D and 3, is located at an axial distance below the inlet end 12 of the fitting 20 to define a volume of the passageway 18*a* proximal the sealing surface 224. The dry sprinkler 10 of FIGS. 1C and 1D is preferably configured for installation in a wet system. In one particular embodiment, a portion of the external threads 204 extend proximally of the sealing surface 224. However, where the sealing surface 224 is axially located such that the sealing assembly of the sprinkler 10 can prevent any fluid accumulation over the inlet surface 222 in the unactuated state of the sprinkler, as seen for example in FIG. 2 and FIG. 8, explained in greater detail below, the dry sprinkler 10 is preferably configured for installation in either a wet system or a dry system.

In the preferred embodiment of the inlet fitting 20' of FIG. 2, the sealing surface 224 is axially located in Section I along the axis A-A, preferably between the entrance surface 222 and the start of fitting threads 204. Alternatively, the sealing surface may be axially located in the head portion 220 of the inlet fitting such that the external threads 204 extend distally of the sealing surface 224. Because the preferred configuration of the inlet fittings threads 204 define the minimum diameter of the inlet fitting 20, the sealing surface 224 diameter is minimized. For a maximum pipe thread diameter of 1¼ inch diameter of the fitting thread 204, the sealing surface defines a preferred internal opening with a diameter of about one inch (1 in.). In the preferred embodiment of the inlet fitting 20 of FIG. 3, the sealing surface 224 is preferably axially located along the body portion 260 of the fitting substantially axially in line with the enlarged transition portion 206 between the end of the external fitting threads 204 and the external clamp groove 266. For a preferred two inch (2 in.) diameter transition portion 206 and more particularly nominal two inch external pipe groove 266, the sealing surface 224 preferably defines a preferred internal opening diameter of about 1¼ inch.

For the preferred outer structure assembly is of FIGS. 1C and 1D, the casing tube 22 extends between an inlet fitting end 24 and an outlet frame end 26. The casing tube 22 has a casing tube inner surface 22*a* that cinctures part of the passageway 18*a*. The second coupling threads 22*c* are disposed proximate the inlet fitting end 24, and the third coupling threads 22*d* are disposed proximate the outlet frame end 26. The casing tube inner surface 22*a* preferably includes an interior groove 28*a* disposed along the longitudinal axis A-A axially proximate to the third coupling threads 22*d*, and the casing tube outer surface 22*b* preferably includes an exterior groove (not shown) disposed along the longitudinal axis A-A axially proximate to the second coupling threads 22*c*.

According to the preferred embodiment shown in FIG. 1D, a casing tube outer surface 22*b* has complementary second coupling threads 22*c* formed proximate the inlet 12 that cooperatively engage first coupling threads 20*a* of the inlet fitting 20. The outer casing tube surface 22*b* preferably also has third coupling threads 22*d* formed proximate the outlet 14 that cooperatively engage fourth coupling threads 30*a* of the outlet frame 30. Alternatively, the casing tube 22 can be coupled to inlet fitting 20 and outlet frame 30 by any suitable technique, such as, for example, crimping, bonding, welding, or by a pin and groove. According to the preferred embodiment, the inlet fitting 20 is provided with first coupling threads 20*a* so that the inlet fitting 20 can be coupled to the second coupling threads 22*c* on the casing tube 22. Due to the preferably narrowing taper of the inlet fitting 20 from the transition portion 206 to the smaller distal end portion 268, the casing tube 22 has a preferably smaller diameter over its length than the transition portion 206. For example, where the transition portion 206 and groove 266 are sized for coupling to a nominal two inch pipe fitting, the casing tube 22 is preferably constructed with a nominal 1¼ inch diameter pipe, Schedule 10 galvanized steel pipe. Alternatively, the inlet fitting 20 and the casing tube 22 can be formed as a unitary member such that first and second coupling threads 20*a* and 22*c* are not utilized. For example, the casing tube 22 can extend as a single tube from the inlet 12 to the outlet 14. Alternatives to the threaded connection to secure the inlet fitting 20 to the casing tube 22 can also be utilized such as other mechanical coupling techniques, ch can include crimping or bonding.

Figure 4:
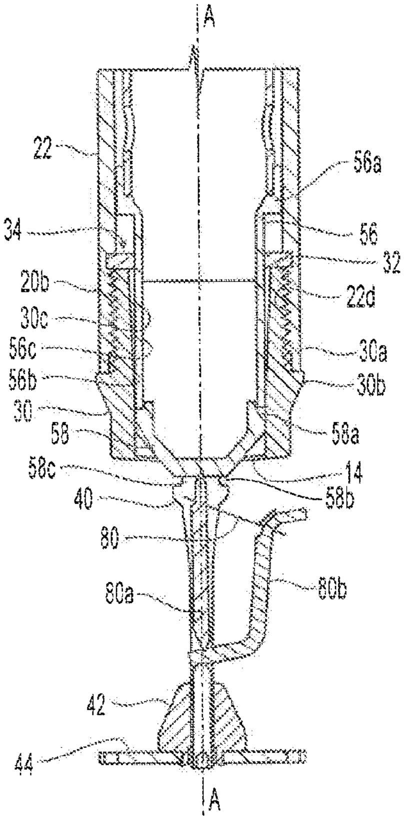
FIG. 4 is a detailed view of another cross-section of a portion of the dry sprinkler of FIGS. 1C and 1D.

Various configurations of the outlet frame 30 can be used with the dry sprinklers 10 according to the preferred embodiments. Any suitable outlet frame 30, however, may be used so long as the outlet frame 30 positions a fluid deflecting structure 40 preferably axially spaced from the outlet 14 of the dry sprinkler 10 at a preferably fixed distance. A preferred outlet frame 30 is shown in the dry sprinkler assembly 10 in FIG. 1C. FIG. 4 shows the preferred outlet 30 in greater detail.

According to the preferred embodiment shown in FIG. 4, the outlet frame 30 has an outlet frame outer surface 30*b* and an outlet frame inner surface 30*c*, which surfaces cincture part of the passageway 18*a*. The outlet frame outer surface 30*b* can be provided with the coupling threads 30*a* formed proximate a casing tube end 32 of the outlet frame 30. The coupling threads 30*a* preferably cooperatively engage the coupling threads 22*d* of the casing tube 22. The outlet frame 30 inner surface 30*c* defines a bore 34 cincturing the passageway 18*a* at the casing tube end 32 of the outlet frame 30.

Referring again to FIG. 1C, a free end of the outlet frame 30 can include at least one frame arm 38 that is coupled to the fluid deflecting structure 40. Preferably, the outlet frame 30 and frame arm 38 are formed as a unitary member. The outlet frame 30, frame arm 38, and fluid deflecting structure 40 can be made from rough or fine casting, and, if desired, machined. Referring to FIG. 1C, the fluid deflecting structure 40 may include an adjustment screw 42 and a planar surface member 44 coupled to the frame arm 38 and preferably fixed at a spaced axial distance from the outlet frame 30. Accordingly, as shown, the preferred outlet frame 30 and deflecting structure 40 provide for a pendent dry sprinkler configuration. The planar surface member 44 is configured to deflect the fluid flow to form an appropriate spray pattern. Instead of a planar surface member 44, other configurations could be employed to provide the desired fluid deflection pattern. However other deflecting structures and dry sprinkler configurations are possible, such as for example, a sidewall deflector can be used to provide for a horizontal sidewall sprinkler. The adjustment screw 42 is provided with external threads 42*a* that can be used to adjust an axial spacing between the inner structure assembly 50 and the thermal trigger 80. The adjustment screw 42 preferably includes a seat portion 42*b* that engages the thermal trigger 80. Although the adjustment screw 42 and the planar surface member 44 have been described as separate parts, they can be formed as a unitary member.

The inner structural assembly 50 of dry sprinkler permits fluid flow between the inlet 12 and the outlet 14. The inner structural assembly 50, preferably, is disposed within the tubular outer structure assembly 18. The terms "tube" or "tubular," as they are used herein, denote an elongate member with a suitable cross-sectional shape transverse to its longitudinal axis, such as, for example, circular, oval, or polygonal. Preferably, each of the inlet fitting 20 and inner structure assembly 50 can be made of a copper, bronze, brass, galvanized carbon steel, carbon steel, or stainless steel material. Moreover, the cross-sectional profiles of the inner and outer surfaces of a tube may be different. According to the preferred embodiment shown in FIGS. 1C, 1D and 5, the inner structural assembly 50 includes a fluid tube 52, a guide tube 56, a trigger seat 58, and a seal assembly 60. In the preferred configuration of the dry sprinkler 10, the seal assembly 60 is engaged with or coupled to the fluid tube 52, and the fluid tube 52 is engaged with or coupled to the guide tube 56, and the guide tube 56 is engaged with or coupled to the trigger seat 58. For the preferred outer structure assembly having the preferred dual connection fitting, any internal assembly may be used provided its operation upon actuation of the dry sprinkler provides the necessary flow.

According to the preferred embodiment shown in FIGS. 1C and 1D, the fluid tube 52 includes a tubular body extending along the longitudinal axis A-A between a seal assembly end 52*a* and a guide tube end 52*b*. The longitudinal length of the fluid tube 52 preferably corresponds to or is substantially the same as that of the casing tube 22. For a preferred nominal 1½ inch casing tube 22, the fluid tube 52 is preferably constructed from 1.125 in. (Inner Diameter)× 1.25 in. (Outer Diameter) preferably stainless steel tubing. The overall length of the dry sprinkler 10 can be selected for preferably locating the outlet frame 30 at a desired distance from a fluid supply pipe, for example, a ceiling, a wall, or a floor of an enclosed area. The overall length can be any value, and is preferably between about two to about fifty inches, more preferably ranging from a minimum of about 9 inches to about 48 inches or other fixed length, depending on the application of the dry sprinkler 10. In one embodiment, the casing tube 36 may define a nominal axial length from its proximal end to its distal end ranging from about 1.5 inches to about 40.5 inches.

Figure 5:
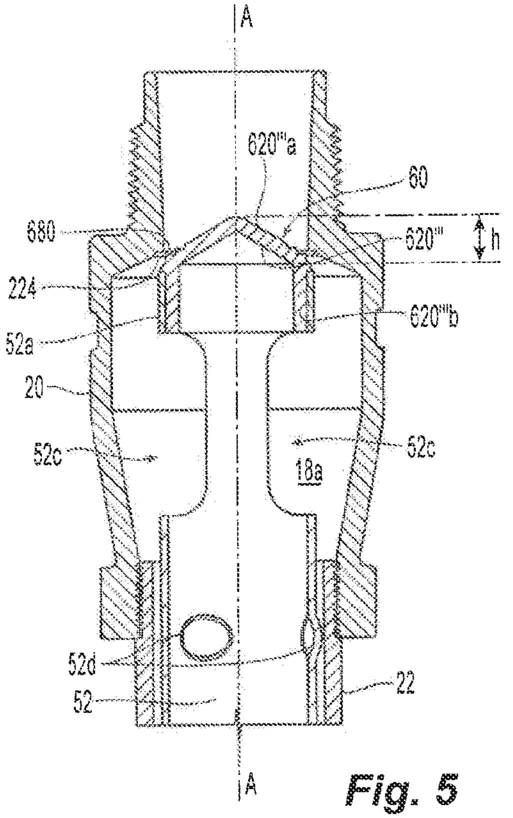
FIG. 5 is a detailed cross-sectional view of the seal assembly in the dry sprinkler of FIGS. 1C and 1D.

The fluid tube 52 can include additional features which facilitate flow through the tube and/or assist in maintaining the substantially centered axial alignment of the tube 52 along the passageway 18*a*. As shown for example in FIG. 5, the fluid tube 52 preferably includes one or more spaced apart apertures or openings 52*c* located between the ends of the tube for introducing fluid into the fluid tube 52. In addition, the fluid tube may include one or more surface features which can act against the casing tube 22 to maintain the fluid substantially centrally aligned along the passageway 18*a*. For example, the fluid tube 52 may include one or more spaced apart surface features, projections, dimples, ridges or bumps 52*d*, preferably formed in the tube 52, such that the projection 52*d* contacts the inner surface of the casing tube 22 to maintain the fluid tube substantially centrally axially aligned within the casing tube 22. Although the surface features 52*d* are shown in FIG. 5 as being formed in the tube, the surface features may be separate structures that are attached or affixed to the fluid tube. The surface features 52*d* are preferably sized and located so as not to greatly interfere with the desired flow and performance characteristics of the dry sprinkler 10. By substantially maintaining the fluid tube in proper axial alignment along the passageway 18*a*, the surface features 52*d* can stabilize the internal structure of the dry sprinkler 10 during shipping and/or transport.

According to the preferred embodiment shown in FIGS. 1C, 1D and 4, the guide tube 56 also includes a tubular body extending along the longitudinal axis A-A between a proximal fluid tube end 56*a* and a distal outlet frame end 56*b*. The trigger seat end 56*b* preferably has an outside diameter sized to smoothly slide in the bore 34 of the outlet frame 30. The fluid tube end 56*a* of the guide tube 56 preferably has an outer surface sized to engage the proximal inlet surface of the outlet frame 30 as a stop surface. With reference to the unactuated dry sprinkler shown in FIG. 1C, the axial distance between the proximal end surface of the outlet frame 30 and the enlarged fluid tube end 56*a* defines the preferred axial travel of the inner structural assembly 50 upon actuation of the sprinkler. The fluid tube end of the guide tube 56 has an inside diameter sized to receive the guide tube end 52*b* of the fluid tube 52. The guide tube 56 has a guide tube inner surface 56*c* that preferably cinctures the passageway 18*a* in the guide tube 56.

According to the preferred embodiment shown in FIG. 4, the trigger seat 58 can include a disk member extending along the longitudinal axis A-A between the guide tube end 58*a*, and a thermal trigger end 58*b*. In the unactuated position of the dry sprinkler 10 (FIG. 1C), the guide tube end 58*a* of the trigger seat 58 is coupled, e.g., contiguously abuts, the trigger seat end of the guide tube 56, and the thermal trigger end 58*b* can include a nub portion 58*c*. The nub portion 58*c* preferably has an interior cavity configured to contiguously engage a terminal end of the thermal trigger 80, which controls displacement of the inner structural assembly 50 relative to the outer structure assembly 18.

Figure 4A:
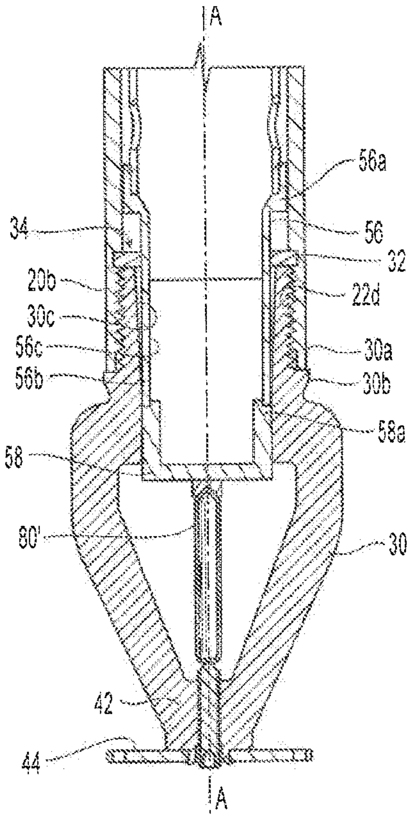
FIG. 4A is an alternate a detailed cross-sectional view of the dry sprinkler of FIGS. 1C and 1D having a thermal trigger in the form of a frangible bulb.

The thermal trigger 80 is disposed proximate to the outlet 14 of the dry sprinkler 10. Preferably, the thermal trigger 80 is a solder link used in combination with a strut 80*a* and lever 80*b* Alternatively, the thermal trigger 80 is a frangible bulb that is interposed between the nub portion 58*c* on the trigger seat 58 and a seat portion 42*b* of the adjustment screw 42, as seen for example, in FIG. 4A. Instead of a frangible bulb 82 or a solder link, the thermal trigger 80 may be any suitable arrangement of components that reacts to the appropriate condition(s) by actuating the dry sprinkler 10.

The thermal trigger 80 operates to: (1) maintain the inner assembly 50 in the unactuated state of the dry sprinkler 10 over a preferred first range of temperatures between about minus 60 degrees Fahrenheit to about just below a temperature rating of the thermal trigger 80 so as to maintain the seal assembly 60 in a fluid tight sealed position against the sealing surface 224; and (2) permit the inner assembly 50 to move along the longitudinal axis A-A over a second range of temperatures at or greater than the temperature rating of the thermal trigger 80 so as to place the dry sprinkler 10 in an actuated state with the seal assembly 60 at an axial position within the inlet fitting 20 such that fluid flows from the sprinkler at an anticipated rate for the given starting fluid pressure at the inlet of the sprinkler and the rated K-factor of the dry sprinkler. More specifically, based on the rated K-factor of the dry sprinkler 10 of the preferred embodiments, the dry sprinkler 10 allows for an actual minimum flow rate in gallons per minute (GPM) through the outlet as a product of the rated K-factor and the square root of the pressure in pounds per square inch gauge (psig) of the fluid fed into the inlet 12 of the dry sprinkler 10. The preferred dry sprinkler 10 has a preferred actual minimum flow rate from the outlet 14 of approximately equal to 95% of the magnitude of a rated. K-factor times the square root of the pressure of the flow of fluid fed into the inlet 12 of each embodiment. The dry sprinkler 10 has a preferred rated discharge coefficient, or rated K-factor, that is greater than 14 GPM/PSI$^{1/2}$ and is preferably 16.8 GPM/PSI$^{1/2}$ or greater. Accordingly, the sprinkler 10 can have a nominal K-factor being any one of 16.8 GPM/PSI$^{1/2}$, 19.6 GPM/PSI$^{1/2}$, 22.4 GPM/PSI$^{1/2}$, 25.2 GPM/PSI$^{1/2}$, 28.0 GPM/PSI$^{1/2}$, 33.6 GPM/PSI$^{1/2}$ or greater at 50% increments over 5.6 GPM/PSI$^{1/2}$. However, any suitable nominal value for the K-factor could be provided for the dry sprinkler of the preferred embodiments.

The temperature rating of the thermal trigger 80 can be a suitable temperature such as, for example, about a nominal 135, 155, 165, 175, 200, 214 or 286 degrees Fahrenheit and plus-or-minus (+/−) 20% of each of the stated values. The thermal trigger 80 is further preferably defined by its thermal sensitivity and more particularly by its Response Time Index (RTI) to measure the rapidity with which the thermal trigger 80 operates in a specific sprinkler assembly as measured under standardized test conditions provided by, for example, Underwriters Laboratories (UL), NFPA 13 provides that sprinklers defined as fast response have a thermal element with an RTI of 50 (meters-seconds)$^{1/2}$ or less; and sprinklers defined as standard response have a thermal element with an RTI of 80 (meters-seconds)$^{1/2}$ or more. The dry sprinkler 10 and its thermal trigger 80 can have an RTI so as to be either a fast response or a standard response sprinkler so as to provide suitable fire protection for a given dry sprinkler installation.

In an unactuated state of the dry sprinkler 10, the inner structural assembly 50 is supported against a portion of the outer structure assembly 18 so that the seal assembly 60 of the inner structure assembly 50, contacts the sealing surface 224 of the inlet fitting 20. Referring to FIGS. 1C, 1D and 5, the seal assembly 60 preferably includes a metallic annulus or disc spring seal 680, e.g., a Belleville spring, which contacts the sealing surface 224 on the inlet fitting 20 in the unactuated position of the dry sprinkler 10. Accordingly, the spring seal 680 preferably provides both a biasing force and a fluid seal. The seal assembly 60, in conjunction with the sealing surface 224 of the inlet fitting 20, can form a seal against fluid pressure proximal at or above the sealing surface 224 at any start pressure from approximately zero to approximately 175 psig so that the portion of the passageway 18*a* distal of the sealing surface 224 is generally free of the fluid disposed above the seal when in an unactuated state. The start pressure, i.e., an initial pressure present at the inlet 12 when the dry sprinkler 10 is actuated, can be at various start pressures. The start pressure is at a preferred minimum five pounds per square inch (5 psig.) and may range from about 5 psig. to about 175 psig.

The spring seal 680 is preferably biased from the sealing surface 224 as the spring seal 680 forms a generally truncated cone generally coaxial with the longitudinal axis A-A. The inner structural assembly 50 may optionally include a biasing member, for example, a spring as shown and described in U.S. Pat. No. 7,559,376 (FIG. 1A, spring 55). In a preferred embodiment, this biasing member extends between the outer structural assembly 18 and the inner structural assembly 50 to bias the inner structural assembly 50 from its position in the unactuated state of the dry sprinkler 10 to its actuated position in the open configuration of the dry sprinkler 10. The force of this biasing member adds to the force of a spring seal 680 of the preferred seal assembly 60 in the closed configuration of the dry sprinkler 10 and adds to the force of the flowing fluid in the open configuration of the dry sprinkler 10.

In operation, when the thermal trigger 80 is actuated, the thermal trigger 80 separates from the dry sprinkler 10. The separation of the thermal trigger 80 removes the support for the inner structural assembly 50 against the resilient spring force of the preferred spring seal 680 and/or the pressure of the fluid at the inlet 12. Consequently, the spring seal 680 separates from the sealing surface 224 as the inner structural assembly 50 translates along the longitudinal axis A-A toward the outlet 14 to its fully actuated position, as shown for example, in FIG. 1D. In the preferred embodiment in which the seal assembly 60 is affixed to the fluid tube, the seal assembly and fluid tube remain at a fixed distance relationship in the translation of the inner structurally assembly 50 from the unactuated to the actuated positions. Moreover, in one aspect the seal assembly 60 remains aligned along the longitudinal axis in each of the unactuated and actuated positions of the inner structurally assembly 50. In another preferred aspect, the interior chamber defined by the inner surface of the inlet fitting 20 remains symmetric about the inner structurally assembly 50.

The axial force provided by the spring seal 680 assists in separating the inner structural assembly 50 from the sealing surface 224 of the inlet fitting 20. With the seal assembly 60 spaced from the sealing surface 224 and preferably located in Section III of the inlet fitting 20, water or another suitable firefighting fluid is allowed to flow through the inlet 12, through the casing 22 and fluid tube 52, out the outlet 14 and impact the planar surface member 44 or another form of deflector distributes the fluid flow over a protection area below the dry sprinkler 10.

The preferred sealing surface 224 of the inlet fitting 20 of FIG. 5 preferably defines an inner diameter of about 1.2 inch. Accordingly, the outer diameter of the spring seal 680 is preferably slightly larger at about 1.3 inches to define area of about 1.3 square inches. Upon sprinkler actuation, the inner assembly preferably locates the spring seal 680 in Section III of the passageway 18*a* of the inlet fitting 20 at a preferred axial distance of about 0.45 inches below the sealing surface 224. Section III of the passageway 18*a* preferably defines a diameter of about two inches (2 in.), which corresponds to a cross-sectional area of the passageway through Section III being about 3.1 square inches. Subtracting the surface area projection defined by the spring seal 680 from the area defined by Section III defines an annular opening having a preferred area of slightly less than two square inches (2 sq. in) through which fluid may flow. Preferred seal surface 224 defines a preferred ratio of the seal surface opening diameter to the Section III diameter to be about 0.6. With an attached sprinkler frame 30 having an outlet 14 with a preferred diameter of about 0.95 inches, it has been determined for a fluid delivery to the inlet 12 of the sprinkler, the preferred dry sprinkler 10 experiences an internal fluid flow and discharge profile that defines a K-factor value of about 17.29 GPM/(PSI)$^{1/2}$ for the dry sprinkler, which is in the K-factor range of a nominal K-factor 16.8 GPM/(PSI)$^{1/2}$.

It has been determined that the K-factor of the preferred dry sprinkler can be altered by a small structural changes in the sprinkler. For example, where the outlet 14 diameter is increased by about 18% to about 1.125 inches and the sealing assembly 60 axial displacement is increased by about 67% to 0.75 inches below the sealing surface 224, the preferred dry sprinkler 10 experiences an internal fluid flow and discharge profile that defines a K-factor value of about 20.47 GPM/(PSI)$^{1/2}$ a fluid delivery to the inlet 12 of the sprinkler. The K-factor of 20.47 GPM/(PSI)$^{1/2}$ falls within the K-factor range of a nominal K-factor of 19.6 GPM/(PSI)$^{1/2}$. Thus, it has been shown for a fractional increase in the structural dimensions of the preferred thy sprinkler, an increase by one nominal K-factor can be realized. Further modifications of the parameters of the inlet fitting can provide for the desired K-Factor. Alternatively in combination with such changes, the inlet size can be increased to achieve various K-factors. Such parameters include changes to the nominal external thread and groove diameters of the inlet fitting in combination with changes in the internal diameters defined by the internal surface of the inlet fitting and features of the internal structural assembly. For one preferred embodiment of a dry sprinkler having an inlet fitting, such as shown in FIG. 3, with an external thread diameter of 1.5 inches and an external groove diameter is nominally 2.5 inches, a nominal K-factor of 25 GPM/(PSI)$^{1/2}$ can be provided when combined with an internal surface defining a minimum inlet surface diameter in the proximal head portion of about 1.3 inches, a nominal fluid tube diameter of 1.5 inches and an outlet diameter of 1.4 inches. For the preferred K-25 sprinkler, the internal assembly included a seal spring having a diameter of 1.5 inches with an axial translation distance of about 0.75 inches in translation from the seal surface to an actuated position within the inlet fitting.

As discussed above, the axial location of the sealing surface 224 within the inlet fitting 20 can define a preferred installation of the dry sprinkler 10 into one of: (i) a wet only system installation; or (ii) a wet or dry system installation. FIGS. 1C, 1D, 5, 6, and 7 showed preferred embodiments of a dry sprinkler 10 having an inlet fitting 20 with a sealing surface 224 for a preferably wet system installation. According to the preferred embodiments, the preferred spring seal 680 is disposed about a mounting member 620 that is preferably fixed to and more preferably at least partially disposed in the proximal end 52*a* of the fluid tube 52. Preferably, the coupling between mounting member 620 and fluid tube 52 can include a weld, adhesive, a pin, a threaded-type coupling, an interference coupling, or any coupling technique suitable for fixedly coupling the mounting portion 620 with the fluid tube 52.

The preferred mounting member 620 includes a diverting portion 620*a* formed integrally with the mounting portion 620*b*. The diverting portion 620*a* preferably defines a surface conical profile to engage and support the spring seal 680 and divert incoming fluid flow about the inner assembly 50. More preferably, the diverter portion preferably extends through the central opening of the seal 680 such that the spring seal is located substantially at the transition between the mounting portion 620*b* and the diverting portion 620*a*. The preferred conical diverting portion 620*a* defines in cross-section height h being preferably about 0.5 inches, and the angle of inclination of the conical face 662" with respect to longitudinal axis A-A is preferably about 70 degrees. The mounting member 620 is preferably hollowed so as to define an interior volume that commingles the interior of the fluid tube 52 when the member 620 is affixed to the tube end 52*a*. The preferred hollowed structure of the mounting member 620 reduces the weight/mass of the member and the inner assembly 50 as a whole.

Figure 6:
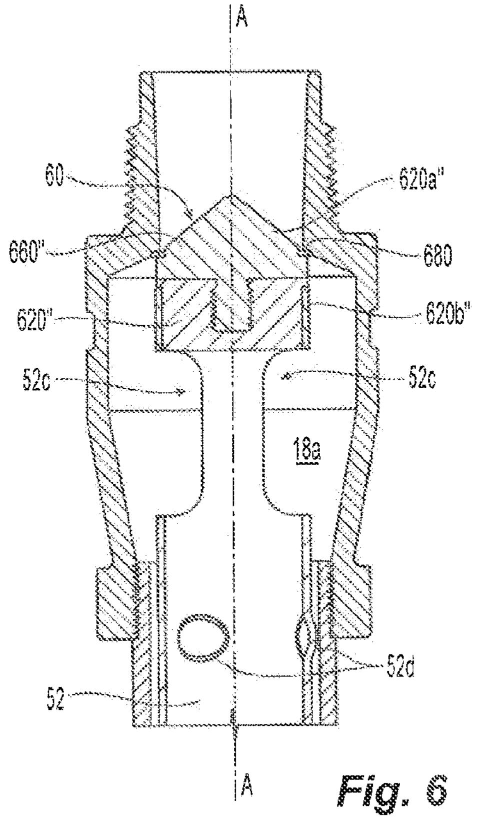
FIG. 6 is a detailed cross-sectional view of another preferred seal assembly for use in the dry sprinkler of FIGS. 1C and 1D.
Figure 7:
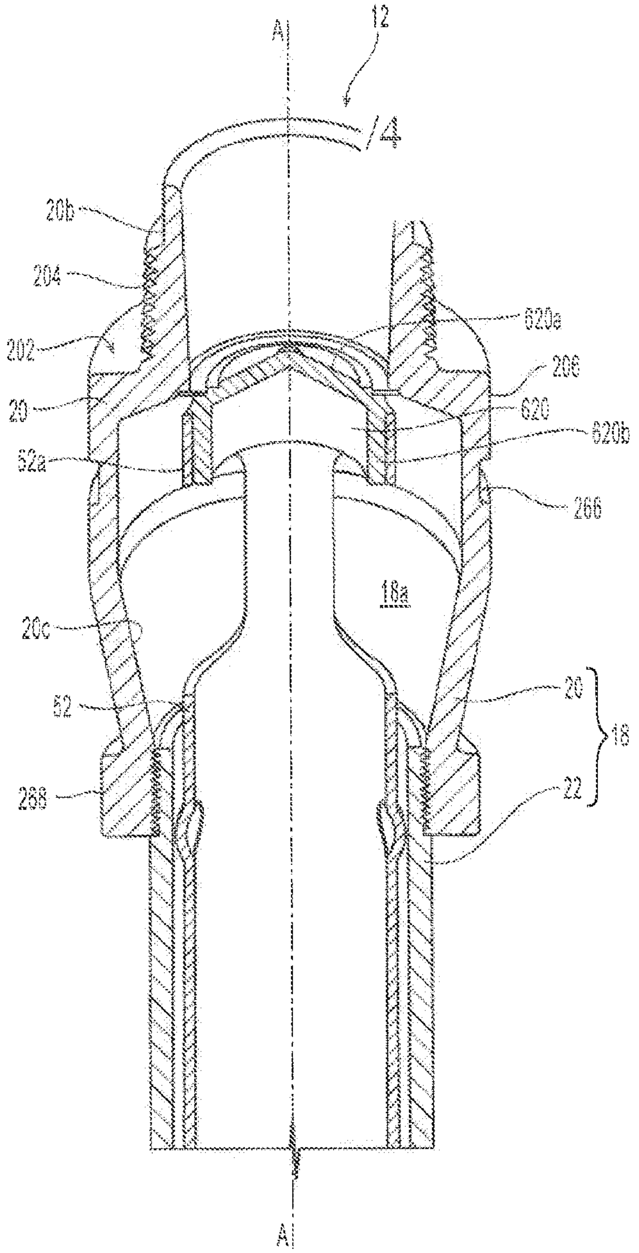
FIG. 7 is a cross-sectional perspective view of the dry sprinkler of FIGS. 1C and 1D.

An alternative construction of the mounting member 620 is shown in FIG. 6. More specifically, the mounting portion is shown as a substantially solid member. More preferably, the mounting member 620" includes a diverter element 620*a*" coupled to a separate mounting element 620*b*". The spring seal 680 is preferably disposed between the diverter element 620*a*" and the mounting element 620*b*". The separate elements are shown being threaded to one another, but they may be coupled or affixed to one another by alternative means. In the mounting member 620 configuration of FIG. 5 or FIG. 6, the mounting portion is affixed to the fluid tube 52 such that the mounting portion 620 is not displaced with respect to the fluid tube 52.

Figure 8:
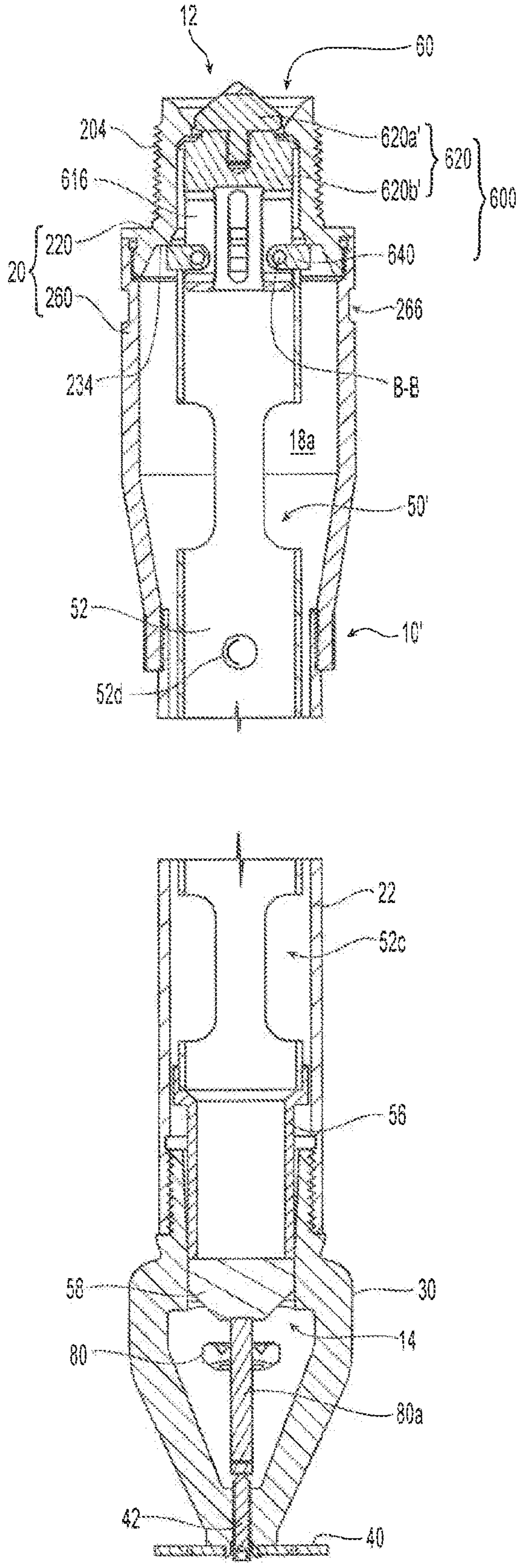
FIG. 8 is a cross-sectional view of another preferred embodiment of a dry sprinkler in an unactuated state using the inlet fitting of FIG. 2.
Figure 8A:
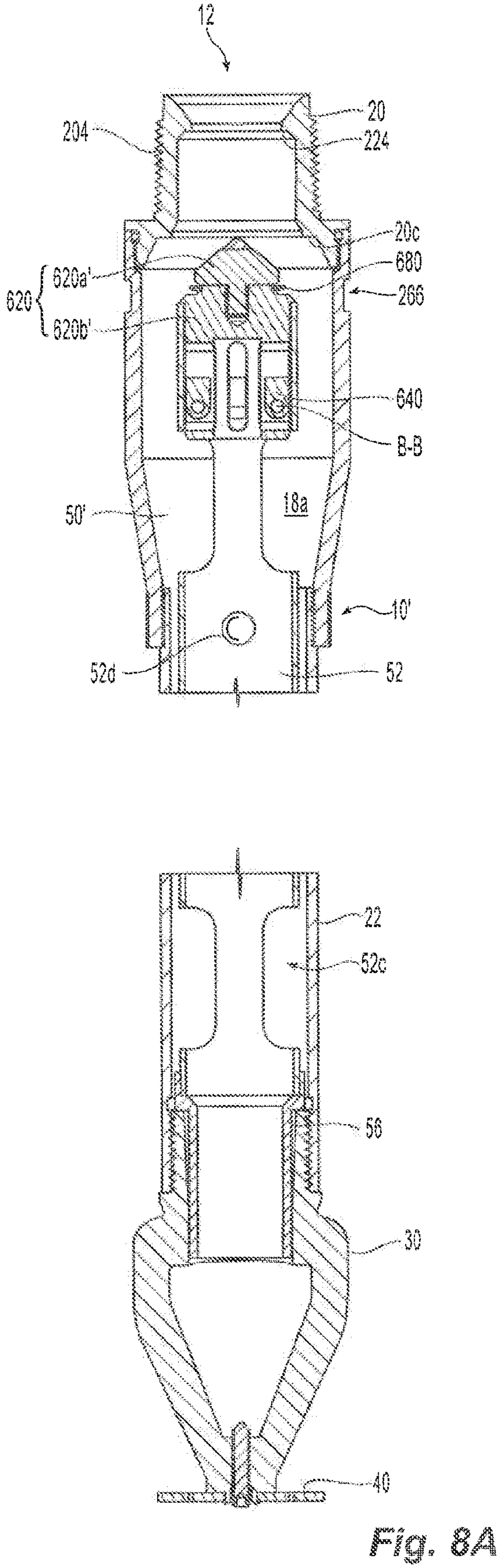
FIG. 8A is a cross-sectional view of the dry sprinkler of FIG. 8 in an actuated state.

Respectively shown in FIGS. 8 and 8A, is an alternate embodiment of the dry sprinkler 10' in an unactuated and actuated state that is configured for wet or dry system installation. The dry sprinkler 10' is shown with the inlet fitting 20 of FIG. 2 in which the sealing surface 224 is located axially proximal to or substantially adjacent to the inlet fitting threads 204 in Section I and more specifically between the entrance surface 222 and the axial start of the fitting threads 204. Accordingly, to properly locate the seal assembly 60 within the preferred Section III inlet fitting 20, the seal assembly requires a longer axial displacement from the sealing surface 224 as compared to the dry sprinkler 10 embodiment of FIGS. 1 and 1A.

The preferred sealing surface 224 of the inlet fitting 20 of FIG. 8 preferably defines an inner diameter of about one inch (1 in.) and more specifically defines an inner diameter of approximately 0.952 inches, which corresponds to an area of about 0.712 square inches defined by the opening at the sealing surface. Accordingly, the outer diameter of the spring seal 680 is preferably about 1.000 inch, which corresponds to a 0.785 square inch surface area projection. Upon sprinkler actuation, the yoke sub-assembly 600 locates the spring seal 680 in section III of the passageway 18*a* of the inlet fitting 20. Section III of the passageway 18*a* preferably defines a diameter of about two inches (2 in.), which corresponds to a cross-sectional area of the passageway through Section III being about three square inches. Subtracting the surface area projection defined by the spring seal 680 from the area defined by Section III defines an annular opening having an area of about two square inches (2 sq. in) through which fluid may flow.

To provide the desired axial displacement of the seal assembly 60, the dry sprinkler 10 includes a contractible inner assembly 50' in which the seal assembly 60 preferably includes a yoke sub-assembly 600. The yoke sub-assembly 600 preferably provides for relative axial displacement between the seal assembly 60 and the fluid tube 52. Accordingly, between the two preferred embodiments of the dry sprinkler 10, 10' shown in FIG. 1C and FIG. 8, the thermal trigger 80, fluid guide tube 56 and fluid tube 52 can have the same axial displacement relative to the outer structural assembly 18 of the dry sprinkler; thus minimizing or eliminating the need for maintaining different sized casing tubes for the two embodied sprinklers 10, 10'. The yoke sub-assembly 600 provides the additional axial displacement of the seal assembly 60 for proper operation and fluid flow from the dry sprinkler 10'. Although the contractible inner assembly 50' is suited for use in with the dual coupling arrangement of the preferred inlet fitting 20 described above and shown in FIG. 2, it should be understood that the preferred inner assembly 50' and yoke subassembly 600 can be used with any dry sprinkler in which relative axial displacement is required between the seal assembly 60 and the fluid tube 52, regardless of the number of coupling arrangements of the inlet fitting 20.

Figure 9:
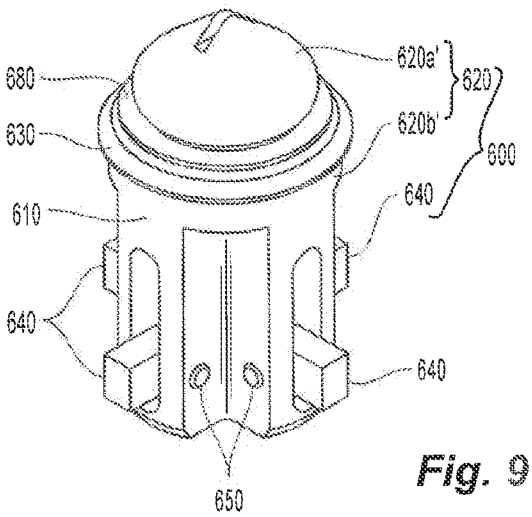
FIG. 9 is a perspective view of a yoke sub-assembly in a first configuration for use in the dry sprinkler of FIGS. 8 and 8A.
Figure 9A:
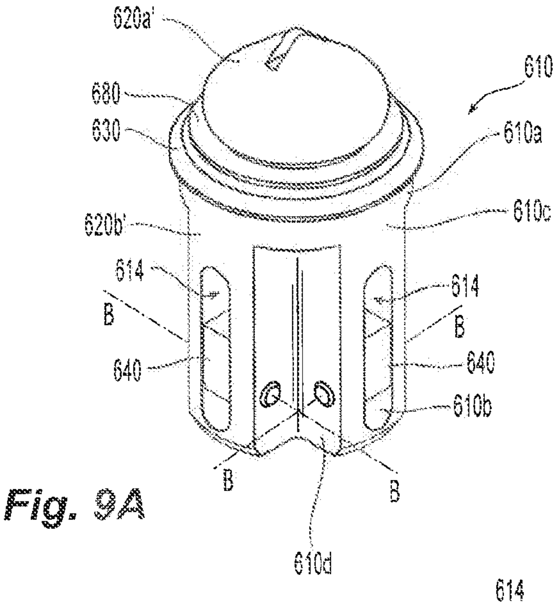
FIG. 9A is a perspective view of the yoke sub-assembly in FIG. 9 in a second configuration for use in the dry sprinkler of FIGS. 8 and 8A.

According to the preferred embodiment shown in FIGS. 8 and 8A, the seal assembly 60 preferably includes a yoke sub-assembly 600. More specifically, the yoke subassembly 600 shown in FIG. 9 is preferably configured with the mounting portion 620*b*' as a yoke 610 with preferably four levers 640 pivotally coupled to the mounting member 620 by, for example, four respective dowel pins 650, the diverter 620*a*' and the spring seal 680. Referring additionally to FIG. 9A, the yoke 610 includes a tubular body that extends along the longitudinal axis A-A between a proximal end 610*a* and a distal end 610*b*. Distributed around a peripheral surface 610*c* of tubular body 610 is a plurality of windows or openings 614 that each extend longitudinally from near the proximal end 610*a* toward the distal end 610*b*, and further preferably includes four windows 614 disposed equiangularly about the longitudinal axis A-A. Each window 614 in the peripheral surface 610*c* provides an opening to a chamber 616 in the tubular body 612. Preferably, individual channels 618 lead from each window 614 to the chamber 616 in the center of the tubular body 610.

Figure 9B:
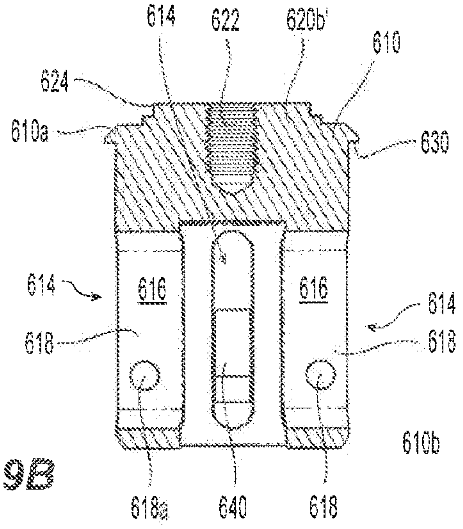
FIG. 9B is a detailed cross-sectional view of the yoke sub-assembly of FIG. 9.

Referring to FIGS. 9, 9A and 9B, individual levers 640 are pivotally pinned in each of the channels 618. Preferably, the pivot action of the levers 640 is provided by dowel pins 650 extending from opposite sides of an individual lever 640 and into corresponding sockets 618*a* on opposite sides of a corresponding channel 618. The sockets 618*a* preferably extend between the channels 618 and facets 610*d* of the peripheral surface 610*c*. Accordingly, individual dowel pins 650 extend along respective pivot axes B-B through portions of the tubular body 610 and through individual levers 640.

Preferably, each lever 640 pivots about axis B-B between a first orientation in which the lever 640 extends substantially perpendicular to the longitudinal axis A-A in the unactuated state of the sprinkler 10' of FIG. 8, to a second orientation in which the lever 640 is substantially parallel to the longitudinal axis A-A in the actuated state of the sprinkler 10' of FIG. 8A. The levers 640 are placed in their first orientation by the contact with the inner surface of the inlet fitting 20 at a first lever distance from the pivot axis B-B, and by the contact with the fluid tube 52 at a second lever distance from the pivot axis B-B. The first lever distance is preferably greater than the second lever distance. Accordingly, in the unactuated arrangement of the yoke sub-assembly 600, the fluid tube 52 bears one surface of the lever 640 and an inner surface of the inlet fitting 20, for example transverse surface 234, bears on an opposing surface of the lever 640 to place the levers 640 in their first orientation outside of the channels 618. The levers perpendicular orientation support the yoke assembly atop the fluid tube 52 such that axial length of the inner assembly 50 is maximized within the passageway 18 and the seal spring 680 is in contact with the sealing surface 224. In the unactuated state of the dry sprinkler 10', the diverting element 620*a*' extends above the sealing surface substantially adjacent the inlet and proximal end of the fitting 20. The conical face of the diverting element 620*a*' minimize and preferably prevents fluid from icing over above the sealing surface 224 by substantially occupying the space above the sealing surface, as seen in FIG. 8, where fluid may otherwise collect. Accordingly, the arrangement of the dry sprinkler 10' is well suited for either wet or dry system installation.

In the actuated arrangement of the dry sprinkler 10' and the yoke sub-assembly 600, operation of the thermal trigger 80 causes an initial axial displacement of the inner structural assembly 50 along the longitudinal axis A-A toward the outlet 14. The preferred axial displacement is defined by the axial length between the top of the outlet frame 30 and the proximal end of the guide tube 65 in the unactuated state of the sprinkler. This initial movement permits the lever 640 to separate from the surface 234 of the inlet 20, allowing the levers 640 to pivot about the pivot axes B-B into their second orientation and into their respective channels 618. The contraction or collapse of the levers 640 into the channels 618 axially displace the yoke sub-assembly 600 along the longitudinal axis A-A relative to the fluid tube 52. More specifically, the levers 640 pivot so as to remove support of the yoke 610 such that the yoke 610 is axially displaced within the tube 52. In one preferred embodiment of actuation of the sprinkler 10', the fluid tube 52 axially translates from the sealing surface at a first distance. Pivot of the levers 640 provide that the yoke sub-assembly 600 axially translates from the sealing distance at a second distance greater than the first distance.

Referring again to FIGS. 9, 9A and 9B, the diverter portion 620*a* is provided at one, preferably upper end 610*a* of the tubular body 610 and includes a threaded mounting aperture 622. Surrounding the threaded mounting aperture 622 is a boss portion 624 that is sized to approximately correspond to an internal diameter of the spring seal 680, which preferably provides a fluid seal with respect to the boss portion 624 on the yoke sub-assembly 600. Surrounding the mounting portion 620*b*' is a travel stop 630 portion preferably projecting radially from the peripheral surface of the tubular body 610. The travel stop 630 limits the distance that the yoke sub-assembly 600 travels along the longitudinal axis A-A inside of and with respect to the fluid tube 52 in the actuated arrangement of the yoke sub-assembly 600. The travel stop 630 shown preferably includes a ring circumscribing the tubular body 612; however, the travel stop 630 may alternatively include one or more projections for engaging the yoke sub-assembly end 52*a* of the fluid tube 52 to limit the distance that the yoke sub-assembly 600 is permitted to travel inside the fluid tube 52. Accordingly, the axial distance between the travel stop 630 and the proximal end of the fluid tube 52 in the unactuated state of the sprinkler 10 defines the axial travel of the yoke subassembly 600 relative to the fluid tube 52.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A sprinkler, comprising:
an inlet fitting comprising a passageway extending from a first inlet end to a second inlet end, an outer surface of the inlet fitting defines a groove between the first inlet end and the second inlet end and a tool engagement portion at the second inlet end;
the tool engagement portion having a lesser outer diameter than a body portion of the inlet fitting, the body portion between the groove and the tool engagement portion;
a seal assembly that seals the passageway, the seal assembly comprising a conical portion and a spring seal between the conical portion and an inner surface of the inlet fitting;
an outlet frame comprising an outlet, a deflector, and at least one frame arm extending from the outlet to the deflector, a length from the first inlet end to the deflector is greater than or equal to 9 inches and less than or equal to 48 inches;
a thermal trigger between the outlet and the deflector, the thermal trigger comprising a solder link coupled with a strut and a lever, the thermal trigger having a temperature rating of a nominal value of 135, 155, 165, 175, 200, 214 or 286 degrees Fahrenheit plus or minus 20 percent of the nominal value;
an inner tube coupled with the seal assembly and extending from the seal assembly towards the outlet, the inner tube moves to unseal the seal assembly responsive to the operation of the thermal trigger; and
a casing tube extending from a first tube end coupled with the second inlet end to a second tube end coupled with the outlet frame.

2. The sprinkler of claim 1, comprising:
the sprinkler having a nominal K-factor of 16.8.

3. The sprinkler of claim 1, comprising:
the thermal trigger having a response time index (RTI) of 50 $(\text{meters-seconds})^{1/2}$ or less.

4. The sprinkler of claim 1, comprising:
the inner tube coupled with a guide tube having a distal end disposed in the outlet frame.

5. The sprinkler of claim 1, comprising:
the second inlet end comprising an internal thread to connect the inlet fitting with the first tube end.

6. The sprinkler of claim 1, comprising:
the outlet frame comprising an internal thread to connect the outlet frame with the second tube end.

7. The sprinkler of claim 1, comprising:
a step between the groove and the first inlet end.

8. The sprinkler of claim 1, comprising:
the tool engagement portion having a hexagon shape.

9. The sprinkler of claim 1, comprising:
the deflector comprising a planar member.

10. A sprinkler, comprising:
an inlet fitting comprising a passageway extending from a first inlet end to a second inlet end, an outer surface of the inlet fitting defines a groove between the first inlet end and the second inlet end and a tool engagement portion at the second inlet end;
the tool engagement portion having a lesser outer diameter than a body portion of the inlet fitting, the body portion between the groove and the tool engagement portion;
a seal assembly that seals the passageway;
an outlet frame comprising an outlet, a deflector, and at least one frame arm extending from the outlet to the deflector;
a thermal trigger between the outlet and the deflector;
an inner tube coupled with the seal assembly and extending from the seal assembly towards the outlet; and
a casing tube extending from a first tube end coupled with the second inlet end to a second tube end coupled with the outlet frame.

11. The sprinkler of claim 10, comprising:
the dry sprinkler having a nominal K-factor of 16.8.

12. The sprinkler of claim 10, comprising:
the thermal trigger comprising a solder link coupled with a strut and a lever.

13. The sprinkler of claim 10, wherein:
actuation of the thermal trigger causes the seal assembly to unseal the passageway responsive.

14. The sprinkler of claim 10, comprising:
the seal assembly comprising a conical portion and a spring seal between the conical portion and an inner surface of the inlet fitting.

15. The sprinkler of claim 10, comprising:
thermal trigger thermally rated for any one of 135, 155, 165, 175, 200, 214 or 286 degrees Fahrenheit.

16. The sprinkler of claim 10, comprising:
the thermal trigger having a response time index (RTI) of 50 $(\text{meters-seconds})^{1/2}$ or less.

17. The sprinkler of claim 10, comprising:
the inner tube coupled with a guide tube having a distal end disposed in the outlet frame.

18. The sprinkler of claim 10, comprising:
the second inlet end comprising an internal thread.

* * * * *